US012407112B2

(12) United States Patent
Wang et al.

(10) Patent No.: US 12,407,112 B2
(45) Date of Patent: Sep. 2, 2025

(54) ANTENNA, ULTRA WIDE BAND ANTENNA ARRAY, AND ELECTRONIC DEVICE

(71) Applicant: Honor Device Co., Ltd., Guangdong (CN)

(72) Inventors: Yu Wang, Shenzhen (CN); Zhijun Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/275,497

(22) PCT Filed: Dec. 14, 2022

(86) PCT No.: PCT/CN2022/138846

§ 371 (c)(1),
(2) Date: Aug. 2, 2023

(87) PCT Pub. No.: WO2023/179113

PCT Pub. Date: Sep. 28, 2023

(65) Prior Publication Data

US 2024/0380130 A1 Nov. 14, 2024

(30) Foreign Application Priority Data

Mar. 24, 2022 (CN) ......................... 202210295360.3

(51) Int. Cl.
*H01Q 21/30* (2006.01)
*H01Q 1/22* (2006.01)
(Continued)

(52) U.S. Cl.
CPC ............... *H01Q 21/30* (2013.01); *H01Q 1/22* (2013.01); *H01Q 9/0414* (2013.01);
(Continued)

(58) Field of Classification Search
None
See application file for complete search history.

(56) References Cited

U.S. PATENT DOCUMENTS 5,986,606 A * 11/1999 Kossiavas ............ H01Q 9/0421 343/846
6,195,048 B1 * 2/2001 Chiba .................... H01Q 5/371 343/700 MS
(Continued)

FOREIGN PATENT DOCUMENTS

CN 106299638 A 1/2017
CN 110048224 A 7/2019
(Continued)

OTHER PUBLICATIONS

S. Lin, X. Yang and L. Ge, "A Miniature Tri-Band Folded Shorted-Patch Antenna for 5G Communication," 2021 Cross Strait Radio Science and Wireless Technology Conference (CSRSWTC), Shenzhen, China, 2021, pp. 237-239.
(Continued)

*Primary Examiner* — Anh Q Tran

(57) ABSTRACT

This application provides an antenna, an ultra wide band antenna array, and an electronic device, where the antenna operates in a target frequency band and is arranged on a metal substrate, and the antenna includes a first radiation patch, a second radiation patch, a first short-circuit wall, and a second short-circuit wall, a projection of the first radiation patch on the metal substrate overlaps with a projection of the second radiation patch on the metal substrate, a projection of the first short-circuit wall on the metal substrate does not overlap with a projection of the second short-circuit wall on the metal substrate, the first short-circuit wall is respectively connected to the first radiation patch and the metal substrate,
(Continued)

(a)

(b)

the second short-circuit wall is respectively connected to the first radiation patch and the second radiation patch.

18 Claims, 13 Drawing Sheets

(51) Int. Cl.
*H01Q 5/25* (2015.01)
*H01Q 9/04* (2006.01)
(52) U.S. Cl.
CPC ......... *H01Q 9/0421* (2013.01); *H01Q 9/0442* (2013.01); *H01Q 9/0457* (2013.01)

(56) References Cited

U.S. PATENT DOCUMENTS

| | | | | |
|---|---|---|---|---|
| 6,930,642 | B2 * | 8/2005 | Kossiavas | H01Q 5/371 343/702 |
| 7,161,540 | B1 | 1/2007 | Liu | |
| 10,727,595 | B2 | 7/2020 | Liu et al. | |
| 11,239,562 | B2 | 2/2022 | Jia | |
| 2004/0032368 | A1 * | 2/2004 | Spittler | H01Q 9/0414 343/700 MS |

FOREIGN PATENT DOCUMENTS

| | | | |
|---|---|---|---|
| CN | 110611160 | A | 12/2019 |
| CN | 214043985 | U | 8/2021 |
| CN | 113659344 | A | 11/2021 |
| CN | 114400441 | A | 4/2022 |
| GB | 2147744 | A | 5/1985 |

OTHER PUBLICATIONS

L. Zaid, G. Kossiavas, J. .-Y. Dauvignac, J. Cazajous and A. Papiemik, “Dual-frequency and broad-band antennas with stacked quarter wavelength elements,” in IEEE Transactions on Antennas and Propagation, vol. 47, No. 4, pp. 654-660, Apr. 1999.

* cited by examiner (a)

(b)

ANTENNA, ULTRA WIDE BAND ANTENNA ARRAY, AND ELECTRONIC DEVICE

CROSS-REFERENCE TO RELATED APPLICATIONS

This application is a national stage of International Application No. PCT/CN2022/138846 filed on Dec. 14, 2022, which claims priority to Chinese Patent Application No. 202210295360.3 filed on Mar. 24, 2022. The disclosures of both of the aforementioned applications are hereby incorporated by reference in their entireties.

TECHNICAL FIELD

Embodiments of this application relate to the field of terminal technologies, and in particular, to an antenna, an ultra wide band antenna array, and an electronic device.

BACKGROUND

With the development and popularization of an ultra wide band (Ultra Wide Band, UWB) technology, data transmission is usually performed on an electronic device by using a UWB antenna array.

For an antenna in the UWB antenna array, a patch antenna is usually used. The patch antenna includes a radiation patch and a feed source, where the radiation patch has a large area and occupies large space on the electronic device. In a possible case, the UWB antenna array operates in two frequency bands, and therefore an area of the radiation patch in the patch antenna needs to be increased, so that the patch antenna can operate in two frequency bands. Because the area of the radiation patch becomes greater, space occupied by the UWB antenna array on the electronic device becomes greater. However, as functions of the electronic device become increasingly abundant, available space of the electronic device becomes increasingly limited, and space occupied by the UWB antenna array on the electronic device becomes smaller. In a possible case, a method of stacking a plurality of patch antennas may reduce the space occupied by the antenna on the electronic device, but radiation efficiency of the plurality of stacked patch antennas is poor.

Based on this, how to reduce the space occupied by the antenna on the electronic device while ensuring good performance of the antenna has become an urgent problem to be resolved.

SUMMARY

Embodiments of this application provide an antenna, an ultra wide band antenna array, and an electronic device, to reduce space occupied by an antenna on the electronic device while ensuring good performance of the antenna.

According to a first aspect, an antenna is provided, where the antenna operates in a target frequency band, a width of the target frequency band is greater than a preset threshold, the target frequency band includes a first frequency and a second frequency, and the antenna is arranged on a metal substrate; and the antenna includes a first radiation patch, a second radiation patch, a first short-circuit wall, and a second short-circuit wall, a projection of the first radiation patch on the metal substrate overlaps with a projection of the second radiation patch on the metal substrate, a projection of the first short-circuit wall on the metal substrate does not overlap with a projection of the second short-circuit wall on the metal substrate, the first short-circuit wall is located between the first radiation patch and the metal substrate, and is respectively connected to the first radiation patch and the metal substrate, the second short-circuit wall is located between the first radiation patch and the second radiation patch, and is respectively connected to the first radiation patch and the second radiation patch, a resonance point of the first radiation patch is the first frequency, and a resonance point of the second radiation patch is the second frequency.

The projection of the first radiation patch on the metal substrate overlaps with the projection of the second radiation patch on the metal substrate, which is equivalent to stacking the first radiation patch and the second radiation patch above the metal substrate. The projection of the first short-circuit wall on the metal substrate does not overlap with the projection of the second short-circuit wall on the metal substrate, which means that the first short-circuit wall and the second short-circuit wall are arranged on two sides of the antenna instead of on a same side.

Optionally, the antenna further includes a filling medium and a feed source.

The filling medium is arranged between the first radiation patch and the metal substrate, and between the first radiation patch and the second radiation patch. It should be understood that a thickness of the filling medium affects performance of the antenna. By properly adjusting the thickness of the filling medium, efficiency of the antenna may be improved.

The filling medium may be liquid crystal polymer (Liquid Crystal Polymer, LCP), also referred to as liquid crystal polymer. The liquid crystal polymer is a novel polymer material, which generally exhibits liquid crystallinity in a molten state. A dielectric constant of LCP is 2.9.

The feed source is respectively connected to the first radiation patch and the second radiation patch, and is configured to send an excitation signal to a cavity formed by the first radiation patch and the metal substrate, and a cavity formed by the first radiation patch and the second radiation patch.

The antenna provided in the embodiments of this application operates in the target frequency band, a width of the target frequency band is greater than a preset threshold, and the target frequency band includes the first frequency and the second frequency. The antenna is arranged on the metal substrate, where the antenna includes a first radiation patch, a second radiation patch, a first short-circuit wall, and a second short-circuit wall, a projection of the first radiation patch on the metal substrate overlaps with a projection of the second radiation patch on the metal substrate, a projection of the first short-circuit wall on the metal substrate does not overlap with a projection of the second short-circuit wall on the metal substrate, the first short-circuit wall is located between the first radiation patch and the metal substrate, and is respectively connected to the first radiation patch and the metal substrate, the second short-circuit wall is located between the first radiation patch and the second radiation patch, and is respectively connected to the first radiation patch and the second radiation patch, a resonance point of the first radiation patch is the first frequency, and a resonance point of the second radiation patch is the second frequency. Because the projection of the first radiation patch on the metal substrate overlaps with the projection of the second radiation patch on the metal substrate, which is equivalent to reducing an area of the metal substrate occupied by the antenna from an area of two radiation patches to an area of one radiation patch. This reduces the area occupied by the antenna on the metal substrate and increases an area of a region of the metal substrate in which another electronic device may be placed. In addition, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved.

In an embodiment, the first short-circuit wall is connected to a first side of the first radiation patch, the first side is a side of the first radiation patch perpendicular to a first radiation side, and the first radiation patch transmits a signal along the first radiation side.

A radiation side refers to a side corresponding to a transmission direction of an electromagnetic wave signal on a radiation patch. Generally, one radiation patch includes two radiation sides that are parallel to each other. A resonance frequency of the radiation patch is related to a length of the radiation side. The higher the resonance frequency, the shorter the length of the radiation side of the antenna.

It should be understood that an area of the first radiation patch may be greater than an area of the second radiation patch, or may be less than an area of the second radiation patch. This is not limited in the embodiments of this application. The first short-circuit wall may be connected to a first side of the first radiation patch perpendicular to the radiation side.

In an embodiment, when the first short-circuit wall is connected to the first side of the first radiation patch, a projection of the first radiation side on the metal substrate overlaps with a projection of a second radiation side of the second radiation patch on the metal substrate, the second short-circuit wall is connected to a second side of the second radiation patch, the second side is a side of the second radiation patch that is farthest from the first side, and the second radiation patch transmits a signal along the second radiation side.

In an embodiment, when the first short-circuit wall is connected to the first side of the first radiation patch, a projection of the first radiation side on the metal substrate overlaps with a projection of a second radiation side of the second radiation patch on the metal substrate, and the second short-circuit wall is connected to a second side of the second radiation patch, the second short-circuit wall is connected to a third side of the first radiation patch, and the third side is a side of the first radiation patch that is not adjacent to the first side.

In an embodiment, when the first short-circuit wall is connected to the first side of the first radiation patch, the projection of the first radiation side on the metal substrate overlaps with the projection of the second radiation side of the second radiation patch on the metal substrate, and the second short-circuit wall is connected to the second side of the second radiation patch, a projection of a fourth side of the second radiation patch on the metal substrate overlaps with a projection of the first side on the metal substrate, and the fourth side is a side that is not adjacent to the second side.

In the embodiments of this application, the first short-circuit wall is respectively connected to the first side of the first radiation patch and the metal substrate, and the second short-circuit wall is respectively connected to the second side of the second radiation patch and the third side of the first radiation patch, or the second short-circuit wall is respectively connected to the second side of the second radiation patch and a radiator of the first radiation patch (equivalent to the projection of the fourth side of the second radiation patch on the metal substrate overlapping with the projection of the first side on the metal substrate). The first side refers to a side of the first radiation patch perpendicular to the first radiation side, the second side refers to a side of the second radiation patch that is farthest from the first side, the third side refers to a side of the first radiation patch that is not adjacent to the first side, and the fourth side is a side that is not adjacent to the second side. The first radiation patch transmits a signal along the first radiation side, and the second radiation patch transmits a signal along the second radiation side. In other words, an antenna is provided in the embodiments of this application, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved. In addition, when the second short-circuit wall is connected to the second side of the second radiation patch, the second short-circuit wall may be connected to the third side, or may be connected to the radiator of the first radiation patch, so that the second short-circuit wall may move on the first radiator, and flexibility of a position of the second short-circuit wall is improved when performance of the antenna is improved.

In an embodiment, when the first short-circuit wall is connected to the first side of the first radiation patch, an area of the second radiation patch is greater than an area of the first radiation patch, the second short-circuit wall is connected to a third side of the first radiation patch, and the third side is a side of the first radiation patch that is not adjacent to the first side.

In an embodiment, when the first short-circuit wall is connected to the first side of the first radiation patch, an area of the second radiation patch is greater than an area of the first radiation patch, and the second short-circuit wall is connected to a third side of the first radiation patch, the second short-circuit wall is connected to the second side of the second radiation patch, the third side is a side of the first radiation patch that is not adjacent to the first side, and the second side is a side of the second radiation patch that is farthest from the first side.

In an embodiment, when the first short-circuit wall is connected to the first side of the first radiation patch, an area of the second radiation patch is greater than an area of the first radiation patch, and the second short-circuit wall is connected to the third side of the first radiation patch, a projection of a fourth side of the second radiation patch on the metal substrate overlaps with a projection of the first side on the metal substrate, and the fourth side is a side of the second radiation patch that is closest to the first side.

In the embodiments of this application, an area of the second radiation patch is greater than an area of the first radiation patch, the first short-circuit wall is respectively connected to the first side of the first radiation and the metal substrate, and the second short-circuit wall is respectively connected to the second side of the second radiation patch and the third side of the first radiation patch, or the second short-circuit wall is respectively connected to the radiator of the second radiation patch (equivalent to the projection of the fourth side of the second radiation patch on the metal substrate overlapping with the projection of the first side on the metal substrate) and the third side of the first radiation patch. The first side refers to a side perpendicular to the first radiation side in the first radiation patch, the second side refers to a side of the second radiation patch that is farthest from the first side, the third side refers to a side of the first radiation patch that is not adjacent to the first side, and the fourth side is a side that is not adjacent to the second side. The first radiation patch transmits a signal along the first radiation side, and the second radiation patch transmits a signal along the second radiation side. In other words, an antenna is provided in the embodiments of this application, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved. In addition, when the second short-circuit wall is connected to the third side of the first radiation patch, the second short-circuit wall may be connected to the second side of the second radiator, or may be connected to the radiator of the second radiation patch, so that the second short-circuit wall may move on the second radiator, and flexibility of a position of the second short-circuit wall is improved when performance of the antenna is improved.

In an embodiment, the antenna further includes a first structural body, and the first structural body is configured to adjust impedance of the first radiation patch; and/or the antenna further includes a second structural body, and the second structural body is configured to adjust impedance of the second radiation patch.

It should be understood that the first structural body and the second structural body may be metal structural bodies. For example, the first structural body may be a metal block having a same width as the first radiation patch, or the first structural body may be a metal block having a same width as the second radiation patch. Adding an additional metal structural body on a radiation patch may change a boundary condition of the radiation patch, to change impedance of the radiation patch.

In the embodiments of this application, the antenna further includes a first structural body, and the first structural body is configured to adjust impedance of the first radiation patch; and/or the antenna further includes a second structural body, and the second structural body is configured to adjust impedance of the second radiation patch. When a region in which the antenna may be placed on the electronic device is limited, the impedance of the first radiation patch is adjusted through the first structural body, and the impedance of the second radiation patch is adjusted through the second structural body. In this way, an antenna with a small size may also meet a requirement. This further reduces space occupied by the antenna in the electronic device, and implements miniaturization of the antenna in the electronic device.

In an embodiment, the antenna further includes a feed source, a third short-circuit wall, and a first metal body, the first radiation patch includes a first groove, the first metal body is arranged in the first groove, one end of the first metal body is connected to the third short-circuit wall, and the other end of the first metal body is connected to the feed source: and when the antenna operates in the target frequency band, the feed source sends an excitation signal to the second radiation patch through a gap between the first metal body and the first radiation patch.

It should be understood that the feed source sends the excitation signal to the second radiation patch through the gap between the first metal body and the first radiation patch, which means that a coupled feed structure is used in the antenna. Magnetic field excitation may be introduced in the coupled feed structure, which enhances excitation to a resonant cavity. In other words, it is equivalent to increasing excitation of a cavity formed by the first radiation patch and the second radiation patch, and the cavity formed by the first radiation patch and the second radiation patch operates at a high frequency. Therefore, it is equivalent to increasing excitation of the high frequency and improving radiation efficiency of the high frequency.

In the embodiments of this application, the first radiation patch further includes a first groove, the first metal body is arranged in the first groove, one end of the first metal body is connected to the third short-circuit wall, and the other end of the first metal body is connected to the feed source, so that when the antenna operates in the target frequency band, the feed source sends an excitation signal to the second radiation patch through a gap between the first metal body and the first radiation patch, which means that a coupled feed structure is used in the antenna. Compared with a direct feeding manner, magnetic field excitation may be introduced through the coupled feed structure, which enhances excitation to a resonant cavity. In this way, radiation efficiency of a magnetic current isotropic antenna in the high frequency band is improved.

In an embodiment, the antenna further includes a feed source and a fourth short-circuit wall, the first radiation patch includes a second groove, the fourth short-circuit wall is connected to the second radiation patch and the metal substrate through the second groove, and the feed source sends an excitation signal to the fourth short-circuit wall through the first radiation patch.

It should be understood that the feed source sends an excitation signal to the fourth short-circuit wall through the first radiation patch, which means that excitation of a horizontal field is introduced by the antenna, so that an electric field direction of an upper cavity and an electric field direction of a lower cavity are opposite. The upper cavity refers to a cavity formed by the first radiation patch, and the second radiation patch, and the lower cavity refers to a cavity formed by the first radiation patch and the metal substrate. Horizontal feeding may cause a magnetic current to be in a same direction when the antenna operates at a low frequency, and improve radiation efficiency at the low frequency.

In the embodiments of this application, the antenna includes a first radiation patch, a second radiation patch, a first short-circuit wall, a second short-circuit wall, a fourth short-circuit wall, and a feed source. The first radiation patch further includes a first groove, so that when the antenna operates, the feed source performs horizontal feeding on the fourth short-circuit wall through the first radiation patch, which is equivalent to introducing excitation of a horizontal field. Therefore, an electric field direction of an upper cavity and an electric field direction of a lower cavity are opposite, so that in a lower frequency band, a magnetic flow of the upper cavity and a magnetic flow of the lower cavity are in a same direction, and radiation efficiency of the lower frequency band is improved.

In an embodiment, a length of the first radiation patch is ¼ $\lambda_1$, and a length of the second radiation patch is ¼ $\lambda_2$, where $\lambda_1$ is a wavelength corresponding to the first frequency, and $\lambda_2$ is a wavelength corresponding to the second frequency.

In the embodiments of this application, a length of the first radiation patch is ¼ $\lambda_1$, and a length of the second radiation patch is ¼ $\lambda_2$, where $\lambda_1$ is a wavelength corresponding to the first frequency, and $\lambda_2$ is a wavelength corresponding to the second frequency. In the conventional technology, a length of a patch antenna is usually half the wavelength of a resonant frequency. Compared with a size of the patch antenna in the conventional technology, the antenna is used in the embodiments of this application. In this way, an area occupied by the antenna on the metal substrate is further reduced, and an area of a region of the metal substrate in which another electronic device may be placed is increased.

According to a second aspect, an ultra wide band antenna array is provided, where the ultra wide band antenna array includes at least three antennas according to the first aspect.

It should be understood that a structure of each antenna in the UWB antenna array is similar to the antenna structure according to the first aspect, and a position relationship of each antenna in the UWB antenna array meets a requirement for implementing a function of the UWB antenna array. For example, a distance between two antennas that perform angle measurement in a same direction is greater than ¼ λ and less than ½ λ. λ refers to a wavelength corresponding to a frequency band in which the antenna operates.

The UWB antenna array provided in the embodiments of this application includes the antenna according to the first aspect. The antenna operates in the target frequency band, a width of the target frequency band is greater than a preset threshold, and the target frequency band includes the first frequency and the second frequency. The antenna is arranged on the metal substrate, where the antenna includes a first radiation patch, a second radiation patch, a first short-circuit wall, and a second short-circuit wall, a projection of the first radiation patch on the metal substrate overlaps with a projection of the second radiation patch on the metal substrate, a projection of the first short-circuit wall on the metal substrate does not overlap with a projection of the second short-circuit wall on the metal substrate, the first short-circuit wall is located between the first radiation patch and the metal substrate, and is respectively connected to the first radiation patch and the metal substrate, the second short-circuit wall is located between the first radiation patch and the second radiation patch, and is respectively connected to the first radiation patch and the second radiation patch, a resonance point of the first radiation patch is the first frequency, and a resonance point of the second radiation patch is the second frequency. Because the projection of the first radiation patch on the metal substrate overlaps with the projection of the second radiation patch on the metal substrate, which is equivalent to reducing an area of the metal substrate occupied by the antenna from an area of two radiation patches to an area of one radiation patch. This reduces the area occupied by the antenna on the metal substrate and increases an area of a region of the metal substrate in which another electronic device may be placed. In addition, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved.

According to a third aspect, an electronic device is provided. The electronic device includes the ultra wide band antenna array according to the second aspect.

It should be understood that the electronic device may be a mobile phone, a smart screen, a tablet computer, a wearable electronic device, an in-vehicle electronic device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device is not limited in the embodiments of this application.

The electronic device provided in the embodiments of this application includes the ultra wide band antenna array according to the second aspect, and the ultra wide band antenna array includes at least three antennas according to the first aspect. The antenna operates in the target frequency band, a width of the target frequency band is greater than a preset threshold, and the target frequency band includes the first frequency and the second frequency. The antenna is arranged on the metal substrate, where the antenna includes a first radiation patch, a second radiation patch, a first short-circuit wall, and a second short-circuit wall, a projection of the first radiation patch on the metal substrate overlaps with a projection of the second radiation patch on the metal substrate, a projection of the first short-circuit wall on the metal substrate does not overlap with a projection of the second short-circuit wall on the metal substrate, the first short-circuit wall is located between the first radiation patch and the metal substrate, and is respectively connected to the first radiation patch and the metal substrate, the second short-circuit wall is located between the first radiation patch and the second radiation patch, and is respectively connected to the first radiation patch and the second radiation patch, a resonance point of the first radiation patch is the first frequency, and a resonance point of the second radiation patch is the second frequency. Because the projection of the first radiation patch on the metal substrate overlaps with the projection of the second radiation patch on the metal substrate, which is equivalent to reducing an area of the metal substrate occupied by the antenna from an area of two radiation patches to an area of one radiation patch. This reduces the area occupied by the antenna on the metal substrate and increases an area of a region of the metal substrate in which another electronic device may be placed. In addition, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved.

DESCRIPTION OF EMBODIMENTS

Figure 1:
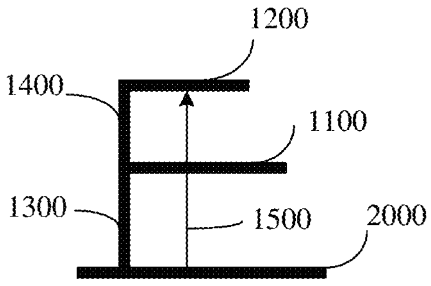
FIG. 1 is a schematic diagram of a structure of an antenna in the conventional technology.

The following clearly and thoroughly describes technical solutions in embodiments of this application with reference to the accompanying drawings. In the description of the embodiments of this application, "/" means "or" unless otherwise specified. For example, A/B may represent A or B. In the text, "and/or" describes only an association relationship for describing associated objects and represents that three relationships may exist. For example, A and/or B may represent the following three cases: Only A exists, both A and B exist, and only B exists. In addition, in the description of the embodiments of this application, "plurality" means two or more.

The terms "first" and "second" mentioned below are merely intended for a purpose of description, and shall not be understood as an indication or implication of relative importance or implicit indication of the number of indicated technical features. Therefore, a feature defined to be "first" or "second" may explicitly or implicitly include one or more features. In the description of this embodiment of this application, unless otherwise stated, "a plurality of" refers to two or more.

At a current stage, as more functions are integrated in an electronic device, these functions are implemented by an increased quantity of electronic components arranged in the electronic device. The increased quantity of electronic devices takes up more space in the electronic device, resulting in less space in the electronic device in which an antenna may be arranged.

As a common antenna, a patch antenna usually has a large area of a radiation patch configured to radiate a signal. Therefore, the radiation patch occupies a large area on a metal substrate in the electronic device. This results in a small area of the electronic device in which another electronic device is arranged. When the patch antenna operates in a wide frequency band, an area of the radiation patch is further increased, to meet a requirement of the wide frequency band.

As a new communication technology, a UWB technology does not need to use a carrier wave in a conventional communication technology to transmit data, but transmits the data through an extremely narrow pulse at or below a nanosecond level. Through the UWB technology, the electronic device may achieve accurate indoor positioning, and perceives a spatial position just like the human eye does. Pointing to any smart device may be directly controlled, and angle measurement accuracy may reach ±3°, just like a high-accuracy version of "indoor GPS". Generally, the electronic device implements distance and angle measurement through the UWB antenna array. The UWB antenna array usually includes at least three patch antennas. For example, the UWB antenna array of the electronic device includes three patch antennas. If the patch antenna in the conventional technology is used, larger space in the electronic device is occupied.

To reduce the space of the electronic device occupied by the patch antenna operating in a wide frequency band, the patch antenna may be arranged as two stacked radiation patches. A resonance point of one radiation patch is a lower frequency in the wide frequency band, and a resonance point of the other radiation patch is a higher frequency in the wide frequency band. By stacking the two radiation patches, a function of the patch antenna operating in the wide frequency band is implemented, and the space of the electronic device occupied by the patch antenna is simultaneously reduced.

For example, as shown in FIG. 1, the patch antenna operates at 6.5 GHz to 8 GHz, and the patch antenna 1000 includes a first radiation patch 1100, a second radiation patch 1200, a first short-circuit wall 1300, a second short-circuit wall 1400, and a feed source 1500. The first radiation patch 1100 and the second radiation patch 1200 are stacked. The first short-circuit wall 1300 and the second short-circuit wall 1400 are arranged on a same side of the patch antenna 1000. A resonance point of the first radiation patch 1100 is 6.5

GHZ, and a resonance point of the second radiation patch 1200 is 8 GHz. The first short-circuit wall 1300 is located between the first radiation patch 1100 and a metal substrate 2000, and is configured to connect the first radiation patch 1100 and the metal substrate 2000, to implement short circuit of the first radiation patch 1100 to ground. The second short-circuit wall 1400 is located between the first radiation patch 1100 and the second radiation patch 1200, and is configured to connect the second radiation patch 1200 and the metal substrate 2000, to implement a function of short circuit of the second radiation patch 1200 to ground. Usually, the first short-circuit wall 1300 and the second short-circuit wall 1400 are arranged on the same side of the antenna. For example, as shown in FIG. 2, the first short-circuit wall 1300 and the second short-circuit wall 1400 are arranged on the same side of the patch antenna 1000.

Figure 2:
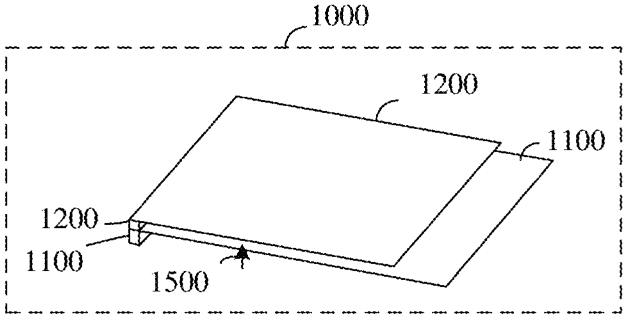
FIG. 2 is a front view of an antenna in the conventional technology.
Figure 3:
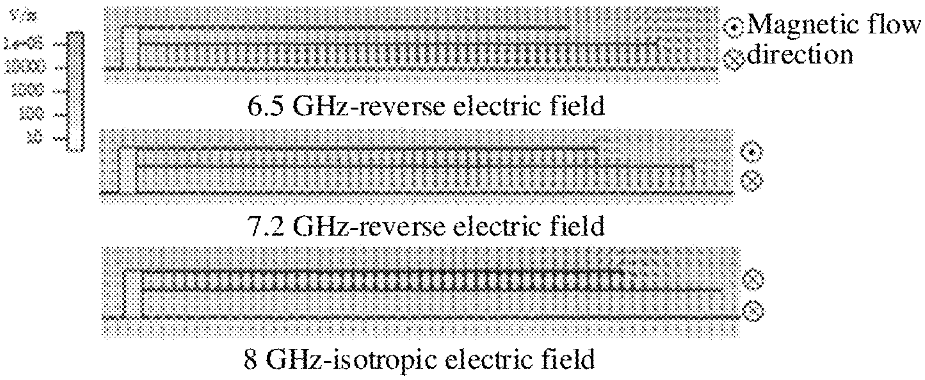
FIG. 3 is a schematic diagram of an electric field distribution of an antenna in the conventional technology.
Figure 4:
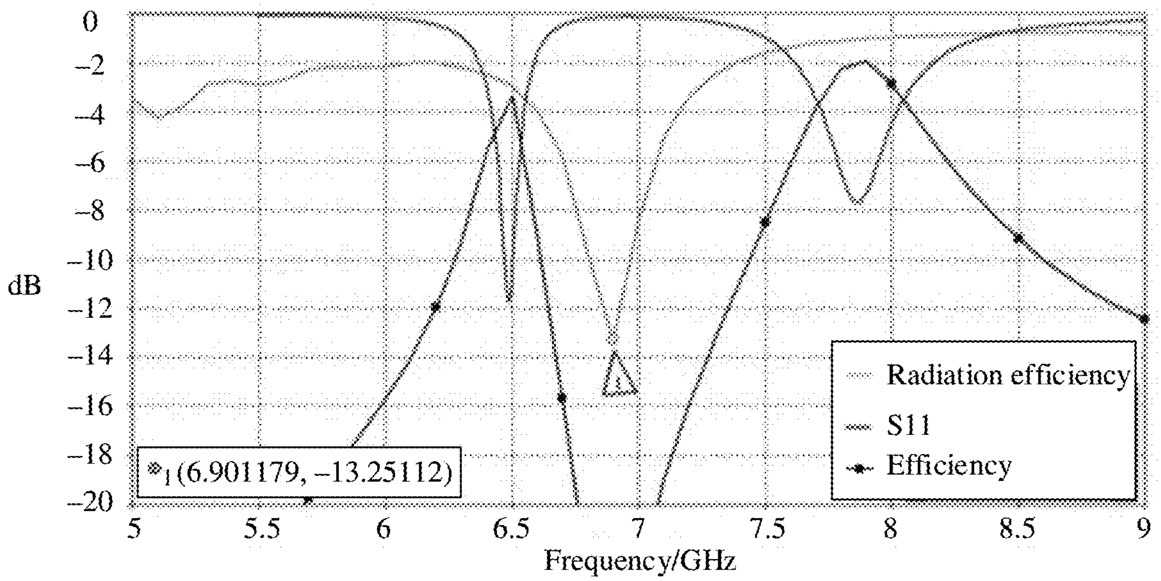
FIG. 4 is a schematic diagram of an S parameter of an antenna in the conventional technology.

However, the patch antenna 1000 shown in FIG. 2 is used, and an electric field distribution diagram at 6.5 GHz, an electric field distribution diagram at 7.2 GHz, and an electric field distribution diagram at 8 GHz are as shown in FIG. 3. It may be learnt that when the patch antenna 1000 operates at 6.5 GHz, an electric field direction of an upper cavity and an electric field direction of a lower cavity are opposite, and equivalent magnetic current directions are opposite. The upper cavity refers to a cavity formed by the first radiation patch 1100 and the second radiation patch 1200, and the lower cavity refers to a cavity formed by the first radiation patch 1100 and the metal substrate 2000. In a patch antenna 1000 at 7.2 GHz, an equivalent magnetic current of the upper cavity and an equivalent magnetic current of the lower cavity are similar in strengths, but are opposite in directions, and magnetic current strengths that offset each other are the greatest. When the patch antenna 1000 operates at 8 GHz, the electric field direction of the upper cavity and the electric field direction of the lower cavity are the same, and magnetic current directions are also the same. This would result in reduced efficiency for the patch antenna 1000 at 7.2 GHz shown in FIG. 2. For example, as shown in FIG. 4, the patch antenna at 7.2 GHz shown in FIG. 2 has an efficiency pit.

For ease of understanding, the following first introduces related terms and concepts that may be involved in the embodiments of this application.

(1) UWB Technology

The UWB technology is a wireless carrier communication technology. Different from conventional communication technologies, the UWB technology does not use a sinusoidal carrier wave to transmit data, but use a nanosecond-level non-sine wave narrow pulse to transmit data, and therefore a spectrum occupied by the UWB technology is wide. The UWB technology has advantages of low system complexity, low power spectral density of transmitted signals, insensitivity to channel fading, low interception capability, and high positioning accuracy. The UWB technology is especially applicable to high-speed wireless access in dense multi-path places such as indoors.

(2) Patch (Patch) Antenna

The patch antenna is a popular microstrip antenna, also referred to as a panel antenna. The patch antenna is usually formed by suspending a metal patch on another larger metal substrate, and a filling medium is usually set between the metal patch and the metal substrate. For example, the filling medium may refer to liquid crystal polymer (Liquid Crystal Polymer, LCP).

(3) Radiation Patch

A metal patch in the patch antenna is the radiation patch.

(4) Short-Circuit Wall

For a microstrip antenna, a current of the antenna forms a standing wave between the metal patch and the metal substrate, and an electric field is zero at half the length of the metal patch. If the microstrip antenna is short-circuited to ground herein, an electric field distribution of the antenna is not affected, and a size of the antenna may be reduced to half of an original size. A metal structure used to connect the metal patch and the metal substrate (a reference ground) is the short-circuit wall.

It should be noted that a metal pin may further be used to connect the metal patch and the reference ground, to implement a function of a short circuit to ground. The metal pin is referred to as a short-circuit pin.

The following describes technical solutions of embodiments in this application with reference to accompanying drawings.

Figure 5:
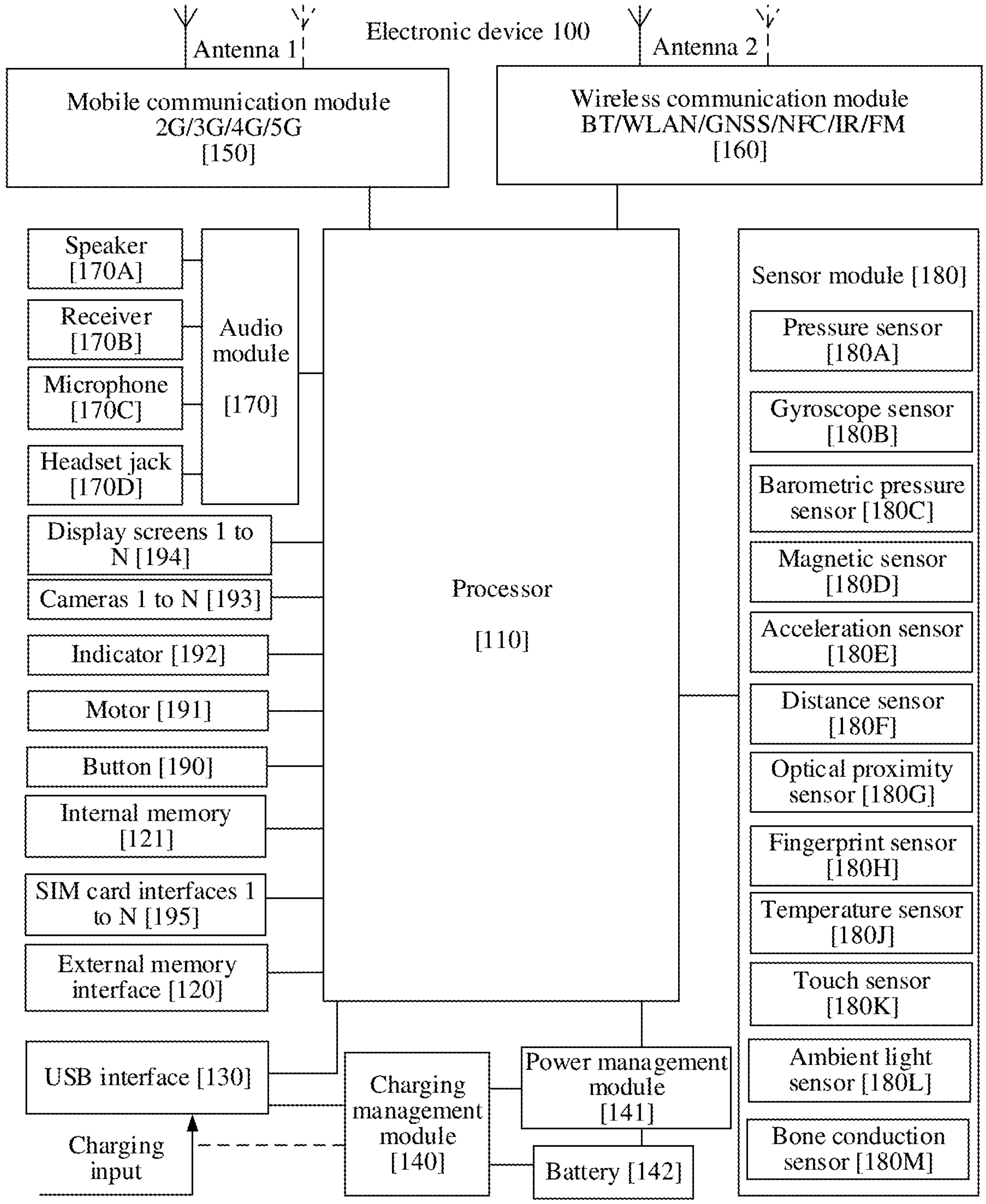
FIG. 5 is a schematic diagram of a structure of an electronic device according to an embodiment of this application.

FIG. 5 shows a hardware system applicable to an electronic device of this application.

The electronic device 100 may be a mobile phone, a smart screen, a tablet computer, a wearable electronic device, an in-vehicle electronic device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in the embodiments of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It is to be noted that the structure shown in FIG. 5 does not constitute a specific limitation on the electronic device 100. In some other embodiments of this application, the electronic device 100 may include more or fewer components than the components shown in FIG. 5, the electronic device 100 may include a combination of some of the components shown in FIG. 5, or the electronic device 100 may include subcomponents of some of the components shown in FIG. 5. The components shown in FIG. 5 may be implemented by hardware, software, or a combination of software and hardware.

A connection relationship among the modules shown in FIG. 5 is merely an example for description, and constitutes no limitation on the connection relationship between modules of the electronic device 100. Optionally, a combination of a plurality of connection modes may also be used in each module of the electronic device 100 in the foregoing embodiments.

A wireless communication function of the electronic device 100 may be implemented through components such as the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch. In some embodiments, when a distance between a living body and the electronic device is small, because the living body is a lossy medium of an electromagnetic wave, a boundary condition of an antenna 1 and/or an antenna 2 changes. This affects efficiency of the antenna 1 and/or the antenna 2.

The mobile communication module 150 may provide a wireless communication solution applied to the electronic device 100, such as at least one of the following solutions: a 2$^{nd}$ generation (2$^{nd}$ generation, 2G) mobile communication solution, a 3$^{rd}$ generation (3$^{rd}$ generation, 3G) mobile communication solution, a 4$^{th}$ generation (4$^{th}$ generation, 4G) mobile communication solution, and a 5$^{th}$ generation (5$^{th}$ generation, 5G) mobile communication solution. The mobile communications module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and the amplified signal is converted into an electromagnetic wave by the antenna 1 and radiated out. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal by using an audio device (for example, the speaker 170A, the phone receiver 170B, or the like), or displays an image or a video by using the display screen 194. In some embodiments, the modem processor may be an independent component. In some other embodiments, the modem processor may be independent of the processor 110, and is disposed in a same component as the mobile communication module 150 or another function module. In some embodiments, the received reference signal used to indicate a signal strength of the received signal may be obtained from a measurement module in the modem processor.

Similar to the mobile communication module 150, the wireless communication module 160 may also provide a wireless communication solution applied to the electronic device 100, such as at least one of the following solutions: a wireless local area network (wireless local area network, WLAN) Bluetooth (Bluetooth, BT), Bluetooth low energy (Bluetooth low energy, BLE), an ultra wide band (ultra wide band, UWB), a global navigation satellite system (global navigation satellite system, GNSS), frequency modulation (frequency modulation, FM), near field communication (near field communication, NFC), and an infrared (infrared, IR) technology. The wireless communication module 160 may be one or more components into which at least one communication processing module is integrated. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 may communicate with a network and another electronic device through a wireless communication technology. The wireless communication technology may include at least one of the following communication technologies: a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include at least one of the following positioning technologies: a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The solution provided in the embodiments of this application may all be applied to the electronic device shown in FIG. 5. The solution provided in the embodiments of this application may be applied to the antenna shown in FIG. 5, to meet a requirement of miniaturization of the electronic device.

It is to be noted that composition of the electronic device shown in FIG. 5 is only an example, and does not constitute a limitation on an application environment of the solution provided in the embodiments of this application. In a possible case, the electronic device may further have other configurations.

The application scenarios of the embodiments of this application are briefly described below.

Figure 6:
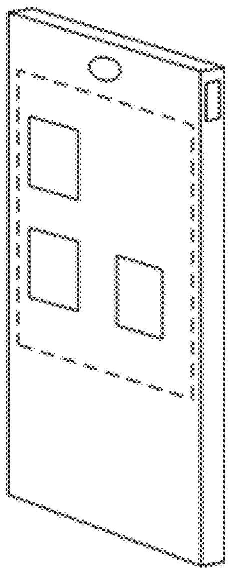
FIG. 6 is a schematic diagram of an application scenario of an antenna according to an embodiment of this application.

As more functions are integrated in the electronic device, more electronic components are arranged in the electronic device. The increased quantity of electronic devices takes up more space in the electronic device, resulting in less space in the electronic device in which an antenna may be arranged. A patch antenna is a common mobile phone antenna, where a radiation patch configured to radiate a signal is usually arranged on a metal substrate of the electronic device, occupying a large area on the metal substrate of the electronic device. This reduces an area of the metal substrate of the electronic device on which another electronic device is arranged. When the patch antenna operates in a wide frequency band, an area of the radiation patch is further increased, to meet a requirement of the wide frequency band. To reduce space of the electronic device occupied by the patch antenna operating in a wide band frequency, the patch antenna may be arranged as two stacked radiation patches, to meet a requirement of the antenna operating in a wide frequency band The UWB antenna array usually includes at least three patch antennas. For example, as shown in FIG. 6, the UWB antenna array includes three patch antennas. If two stacked radiation patches are used in each patch antenna, space occupied by the radiation patches in the electronic device is reduced.

It should be understood that the foregoing is an example for description of an application scenario, and does not constitute any limitation on the application scenario of this application.

The antenna provided in the embodiments of this application is described in detail below with reference to FIG. 7 to FIG. 23.

Figure 7:
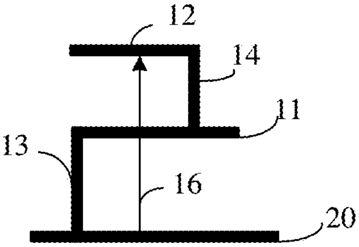
FIG. 7 is a schematic diagram of a structure of an antenna according to an embodiment of this application.
Figure 7:
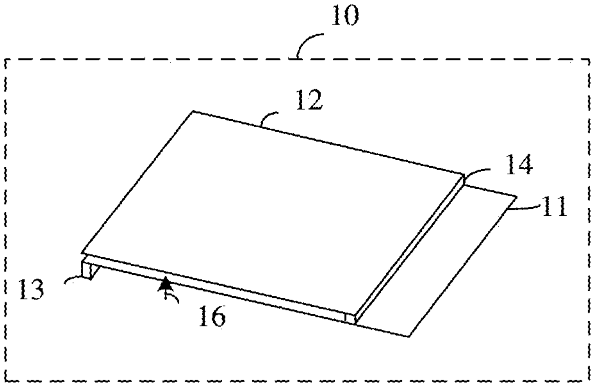

FIG. 7 is a schematic diagram of a structure of an antenna according to an embodiment of this application. As shown in FIG. 7, an antenna 10 operates in a target frequency band, a width of the target frequency band is greater than a preset threshold, the target frequency band includes a first frequency and a second frequency, and the antenna 10 is arranged on a metal substrate 20; and the antenna 10 includes a first radiation patch 11, a second radiation patch 12, a first short-circuit wall 13, and a second short-circuit wall 14, a projection of the first radiation patch 11 on the metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, and is respectively connected to the first radiation patch 11 and the metal substrate 20, the second short-circuit wall 14 is located between the first radiation patch 11 and the second radiation patch 12, and is respectively connected to the first radiation patch 11 and the second radiation patch 12, a resonance point of the first radiation patch 11 is the first frequency, and a resonance point of the second radiation patch 12 is the second frequency.

(a) in FIG. 7 is a front view of an antenna 10 according to an embodiment of this application. (b) in FIG. 7 is a perspective view of the antenna 10 provided in (a) in FIG. 7.

The target frequency band refers to a frequency band whose width is greater than a preset threshold, namely, a wide frequency band. The target frequency band includes the first frequency and the second frequency. The first frequency may refer to a lower frequency in the target frequency band, or may refer to a higher frequency in the target frequency band. A description is made by using an example in which the first frequency refers to the lower frequency in the target frequency band. The first frequency may refer to a lowest frequency in the target frequency band, or may be a frequency lower than a preset low frequency threshold. This is not limited in the embodiments of this application.

When the antenna operates at a resonance frequency (or a resonance point) of a radiation side, impedance matching of the antenna is optimal. Therefore, an operating frequency band of the antenna usually refers to a frequency band near the resonance point. A resonance point of the radiation side is usually related to a length of the radiation side. Generally, the length of the radiation side of the antenna is related to an operating frequency of the antenna. The higher the operating frequency, the shorter the length of the radiation side of the antenna. The antenna 10 involved in the embodiments of this application may include a first radiation patch 11 and a second radiation patch 12. A resonance point of the first radiation patch 11 is a first frequency, which means that when the antenna 10 operates at the first frequency, performance of an electromagnetic wave signal in a cavity formed by the first radiation patch 11 and the metal substrate 20 is optimal. For example, a length of a radiation side of the first radiation patch 11 is 6.7 mm, and a corresponding resonance point is 6.5 GHz. When the antenna 10 operates at 6.5 GHz, the performance of the electromagnetic wave signal in the cavity formed by the first radiation patch 11 and the metal substrate 20 is optimal. Similarly, a resonance point of the second radiation patch 11 is a second frequency, which means that when the antenna 10 operates at the second frequency, the performance of the electromagnetic wave signal in the cavity formed by the first radiation patch 11 and the second radiation patch 12 is optimal. For example, a length of a radiation side of the second radiation patch 12 is 5.6 mm, and a corresponding resonance point is 8 GHz. When the antenna 10 operates at 8 GHz, the performance of the electromagnetic wave signal in the cavity formed by the first radiation patch 11 and the second radiation patch 12 is optimal.

As shown in (b) of FIG. 7, the projection of the first radiation patch 11 on the metal substrate 20 overlaps with the projection of the second radiation patch 12 on the metal substrate 20. This means that a total projected area of the antenna 10 on the metal substrate 20 becomes smaller. This reduces an area occupied by the antenna 10 on the metal substrate 20, and increases an area of another electronic device in which the metal substrate 20 is placed.

The first short-circuit wall 13 is arranged between the first radiation patch 11 and the metal substrate 20, and is configured to connect the first radiation patch 11 and the metal substrate 20. Because a short-circuit wall may reduce a size of the antenna to half of an original size without affecting an electric field distribution of the antenna. In other words, the first short-circuit wall 13 may reduce a size of the first radiation patch 11 to half of the original size, which is equivalent to further reducing a volume of the antenna 10.

Similarly, the second short-circuit wall 14 is arranged between the first radiation patch 11 and the second radiation patch 12, and is configured to connect the first radiation patch 11 and the second radiation patch 12. Because the resonance point of the first radiation patch 11 is different from the resonance point of the second radiation patch 12, when the antenna operates at the resonance point of the second radiation patch 12, the first radiation patch 11 is equivalent to a metal conductor, so that the second radiation patch 12 may be connected to the metal substrate 20 through the second short-circuit wall 14, the first radiation patch 11, and the first short-circuit wall 13, to implement a short circuit to ground. Similar to the first radiation patch 11, the second short-circuit wall 14 may reduce a size of the second radiation patch 12 to half of the original size, which is equivalent to further reducing the volume of the antenna 10.

Optionally, a length of the first radiation patch is ¼ $\lambda_1$, and a length of the second radiation patch is ¼ $\lambda_2$, where $\mu_1$ is a wavelength corresponding to the first frequency, and $\lambda_2$ is a wavelength corresponding to the second frequency.

In the embodiments of this application, a length of the first radiation patch is ¼ $\lambda_1$, and a length of the second radiation patch is ¼ $\lambda_2$, where $\lambda_1$ is a wavelength corresponding to the first frequency, and $\lambda_2$ is a wavelength corresponding to the second frequency. In the conventional technology, a length of a patch antenna is usually half the wavelength of a resonant frequency. Compared with a size of the patch antenna in the conventional technology, the antenna is used in the embodiments of this application. In this way, an area occupied by the antenna on the metal substrate is further reduced, and an area of a region of the metal substrate in which another electronic device may be placed is increased.

The projection of the first short-circuit wall 13 on the metal substrate 20 does not overlap with the projection of the second short-circuit wall 14 on the metal substrate 20. In other words, the first short-circuit wall 13 and the second short-circuit wall 14 are not in a same plane, and are respectively arranged on two sides of the antenna 20. For example, as shown in (a) in FIG. 7 and (b) in FIG. 7, the first short-circuit wall 13 may be connected to a left side of the first radiation patch 11, and the second short-circuit wall 14 may be connected to a right side of the second radiation patch 12, but is not connected to a right side of the first radiation patch 11.

It should be understood that the antenna 10 may further include a filling medium 15 and a feed source 16.

The filling medium 15 is arranged between the first radiation patch 11 and the metal substrate 20, and between the first radiation patch 11 and the second radiation patch 12. It should be understood that a thickness of the filling medium 15 affects performance of the antenna 10. By properly adjusting the thickness of the filling medium 15, efficiency of the antenna 10 may be improved.

Figure 8:
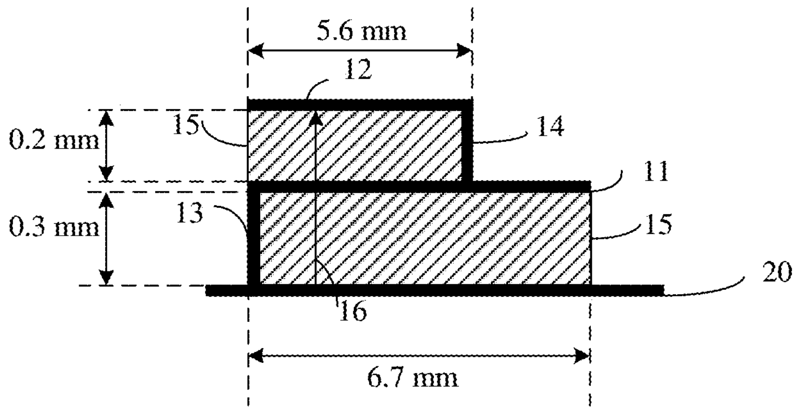
FIG. 8 is a schematic diagram of a size of an antenna according to an embodiment of this application.

For example, as shown in FIG. 8, the length of the radiation side of the first radiation patch 11 is 6.7 mm, and a thickness of the filling medium 15 between the first radiation patch 11 and the metal substrate 20 is 0.3 mm. The length of the radiation side of the second radiation patch 12 is 5.6 mm, and a thickness of the filling medium 15 between the first radiation patch 11 and the second radiation patch 12 is 0.2 mm.

The filling medium 15 may be liquid crystal polymer (Liquid Crystal Polymer, LCP), also referred to as liquid crystal polymer. The liquid crystal polymer is a novel polymer material, which generally exhibits liquid crystallinity in a molten state. A dielectric constant of LCP is 2.9.

The feed source 16 is respectively connected to the first radiation patch 11 and the second radiation patch 12, and is configured to send an excitation signal to a cavity formed by the first radiation patch 11 and the metal substrate 20, and a cavity formed by the first radiation patch 11 and the second radiation patch 12.

An operating principle and effect of the antenna 10 will be described below.

Figure 9:
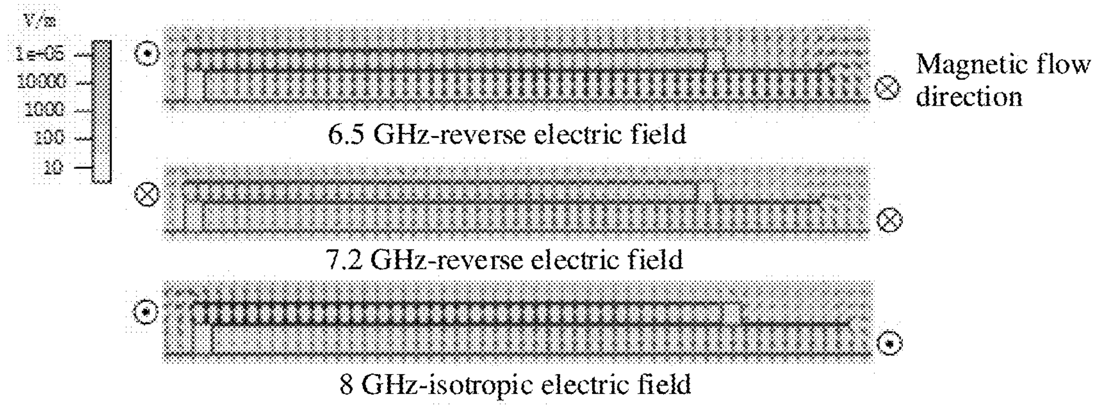
FIG. 9 is a schematic diagram of an electric field distribution of an antenna according to an embodiment of this application.

When the first short-circuit wall 10 and the second short-circuit wall 20 are on two sides of the antenna 10, an electric field strength diagram of the antenna 10 may be as shown in FIG. 9. When the antenna 10 operates at 6.5 GHz, an electric field direction of a cavity (hereinafter referred to as a lower cavity) formed by the first radiation patch 10 and the metal substrate 20, and an electric field direction of a cavity (hereinafter referred to as an upper cavity) formed by the first radiation patch 11 and the second radiation antenna 12 are the same, to be specific, equivalent magnetic current directions are opposite. Because an excited parasitic electric field is strong, an equivalent magnetic current offset is high. Especially compared with the antenna 1000 shown in FIG. 1, the magnetic current offset is higher than a magnetic current offset of the antenna 1000 shown in FIG. 1, resulting in lower radiation efficiency of the antenna 10 at 6.5 GHz. When the antenna 10 operates at 8 GHz, an electric field direction of the upper cavity and an electric field direction of the lower cavity are opposite, to be specific, equivalent magnetic current directions are the same. It means that in a case of 8 GHz, a magnetic current of the upper cavity and a magnetic current of the lower cavity are superimposed on each other, and therefore radiation efficiency of the antenna 10 at 8 GHz is high. Especially compared with the antenna 1000 shown in FIG. 1, magnetic current superposition is higher than magnetic current superposition of the antenna 1000 shown in FIG. 1, so that the radiation efficiency of the antenna 10 at 8 GHz is improved.

Figure 10:
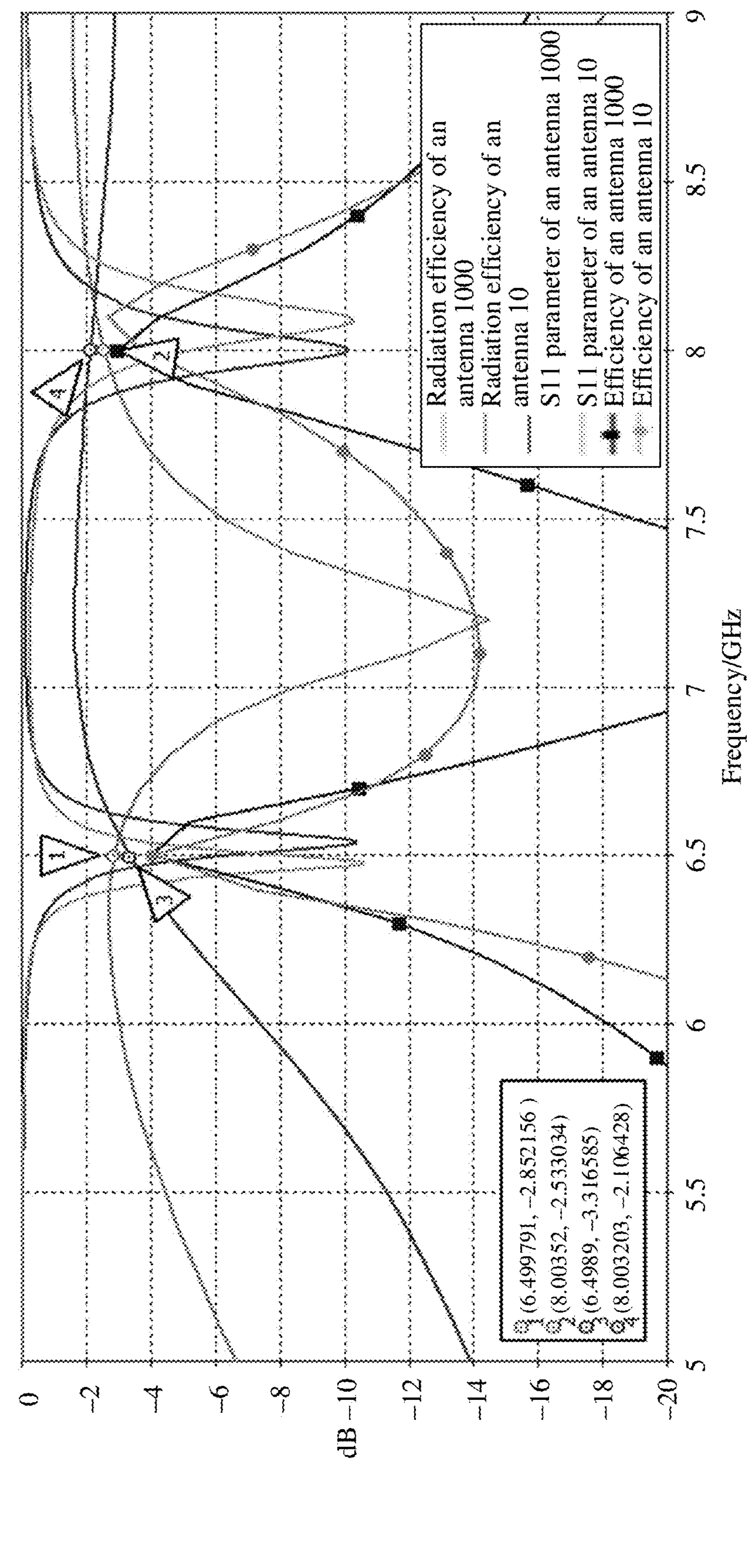
FIG. 10 is a schematic diagram of an S parameter of an antenna according to an embodiment of this application.
Figure 11:
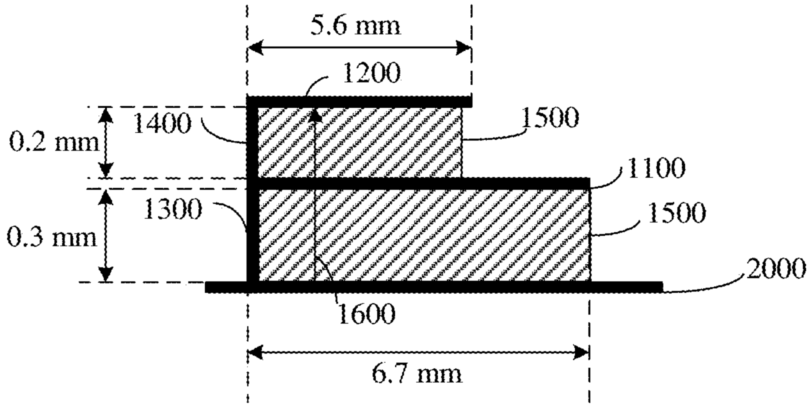
FIG. 11 is a schematic diagram of a size of an antenna according to another embodiment of this application.

For example, an efficiency curve diagram may be as shown in FIG. 10. FIG. 10 is an efficiency curve diagram obtained by simulating the antenna 1000 shown in FIG. 1 and the antenna 10 shown in FIG. 7. A size of the antenna 1000 shown in FIG. 1 is as shown in FIG. 11, a size of the antenna 10 shown in FIG. 7 is as shown in FIG. 8, and a dielectric constant of the filling medium is 2.9. It may be learnt that the first short-circuit wall 1100 and the second short-circuit wall 1200 of the antenna 1000 are on a same side of the antenna 1000. The first short-circuit wall 11 and the second short-circuit wall 12 of the antenna 10 are respectively located on different sides of the antenna 10. A length of the first short-circuit wall 1000 of the antenna 1000 is the same as a length of the first short-circuit wall 10 of the antenna 10. A length of the second short-circuit wall 1200 in the antenna 1000 is the same as a length of the second short-circuit wall 12 in the antenna 10. A height of the filling medium 1500 in the antenna 1000 is the same as a height of the filling medium 15 in the antenna 10. In other words, a difference between the antenna 1000 and the antenna 10 lies in positions of the first short-circuit wall and the second short-circuit wall, and other sizes are the same. As shown in FIG. 10, the antenna 1000 has a pit of radiation efficiency at 7.2 GHz, while the antenna 10 has no pit of the radiation efficiency at 7.2 GHz. Correspondingly, efficiency of the antenna 10 is significantly improved compared with efficiency of the antenna 1000.

The antenna provided in the embodiments of this application operates in the target frequency band, a width of the target frequency band is greater than a preset threshold, and the target frequency band includes the first frequency and the second frequency. The antenna is arranged on the metal substrate, where the antenna includes a first radiation patch, a second radiation patch, a first short-circuit wall, and a second short-circuit wall, a projection of the first radiation patch on the metal substrate overlaps with a projection of the second radiation patch on the metal substrate, a projection of the first short-circuit wall on the metal substrate does not overlap with a projection of the second short-circuit wall on the metal substrate, the first short-circuit wall is located between the first radiation patch and the metal substrate, and is respectively connected to the first radiation patch and the metal substrate, the second short-circuit wall is located between the first radiation patch and the second radiation patch, and is respectively connected to the first radiation patch and the second radiation patch, a resonance point of the first radiation patch is the first frequency, and a resonance point of the second radiation patch is the second frequency. Because the projection of the first radiation patch on the metal substrate overlaps with the projection of the second radiation patch on the metal substrate, which is equivalent to reducing an area of the metal substrate occupied by the antenna from an area of two radiation patches to an area of one radiation patch. This reduces the area occupied by the antenna on the metal substrate and increases an area of a region of the metal substrate in which another electronic device may be placed. In addition, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved.

It should be understood that a projection of the first short-circuit wall 13 on the metal substrate 20 does not overlap with a projection of the second short-circuit wall 14 on the metal substrate 20. Therefore, the second short-circuit wall 14 may or may not be connected to a side of the first radiation patch 11 that is away from the first short-circuit wall 13. This is not limited in the embodiments of this application. In addition, the second short-circuit wall 14 may or may not be connected to a side of the second radiation patch 12 that is away from the first short-circuit wall 13. This is not limited in the embodiments of this application. In addition, an area of the first radiation patch 11 may be greater than an area of the second radiation patch 12, or may be less than an area of the second radiation patch 12. This is not limited in the embodiments of this application. In other words, a position relationship between the first short-circuit wall 13 and the second short-circuit wall 14 is flexible.

Next, the position relationship between the first short-circuit wall 13 and the second short-circuit wall 14 will be described in detail through the antenna structures shown in FIG. 12 to FIG. 17.

In a possible case, the area of the first radiation patch 11 is greater than the area of the second radiation patch 12. In this case, a length of a radiation side of the first radiation patch 11 is greater than a length of a radiation side of the second radiation patch 12.

Because a short-circuit wall usually performs short circuit on the radiation patch and a reference ground, in order not to affect an electric field distribution of the antenna, the short-circuit wall is usually connected to a side of the radiation patch perpendicular to a radiation side.

Optionally, the first short-circuit wall 13 is connected to a first side 111 of the first radiation patch 11, the first side 111 is a side of the first radiation patch 11 perpendicular to a first radiation side 112, and the first radiation patch 11 transmits a signal along the first radiation side 112.

In a possible case, when the first short-circuit wall 13 is connected to the first side 111 on the first radiation patch 11, the second short-circuit wall 14 is connected to a second side 122 of the second radiation patch 12, the second side 122 is a side of the second radiation patch 12 that is farthest from the first side 111, and the second radiation patch 12 transmits a signal along a second radiation side 121. In addition, the second short-circuit wall 14 may be connected to a side of the first radiation patch 11 that is not adjacent to the first side 111, or connected to a radiator of the first radiation patch 11. This is not limited in the embodiments of this application.

Figure 12:
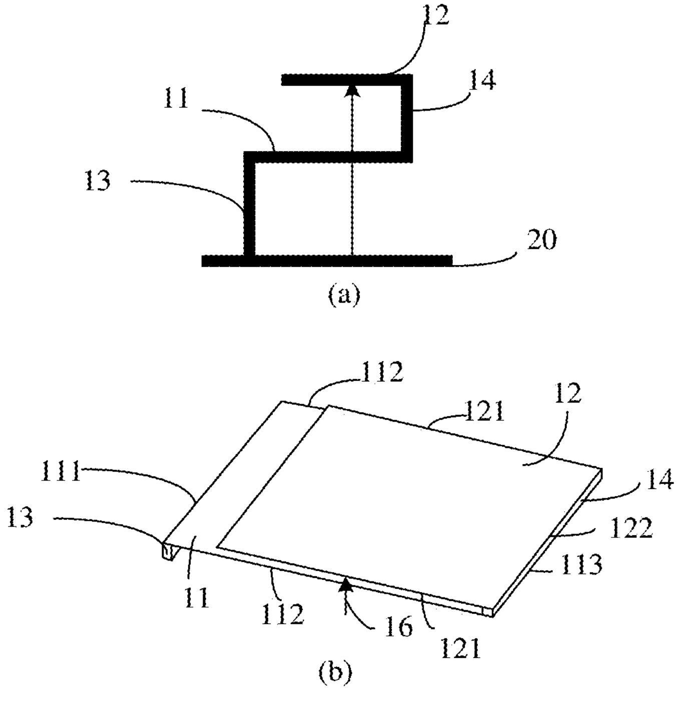
FIG. 12 is a schematic diagram of a structure of an antenna according to another embodiment of this application.

For example, the second short-circuit wall 14 may be connected to a third side 113 on the first radiation patch 11 that is not adjacent to the first side 11. As shown in FIG. 12, (a) in FIG. 12 is a front view of an antenna according to an embodiment of this application. (b) in FIG. 12 is a perspective view of the antenna shown in (a) in FIG. 12. As shown in (a) in FIG. 12 and (b) in FIG. 12, the antenna 10 includes a first radiation patch 11, a second radiation patch 12, a first short-circuit wall 13, and a second short-circuit wall 14, a projection of the first radiation patch 11 on a metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the first side 111 is a side of the first radiation patch 11 perpendicular to a first radiation side 112, the first radiation patch 11 transmits a signal along the first radiation side 112, a projection of the first radiation side 112 on the metal substrate 20 overlaps with a projection of a second radiation side 121 on the metal substrate 20 on the second radiation patch 12, the second short-circuit wall 14 is located between the first radiation patch 11 and the second radiation patch 12, the second short-circuit wall 14 is respectively connected to a second side 122 of the second radiation patch 12 and a third side 113 of the first radiation patch 11, the second side 122 is a side of the second radiation patch 12 that is farthest from a first side 111, the second radiation patch 12 transmits a signal along the second radiation side 121, and the third side 113 is a side of the first radiation patch that is not adjacent to the first side.

Figure 13:
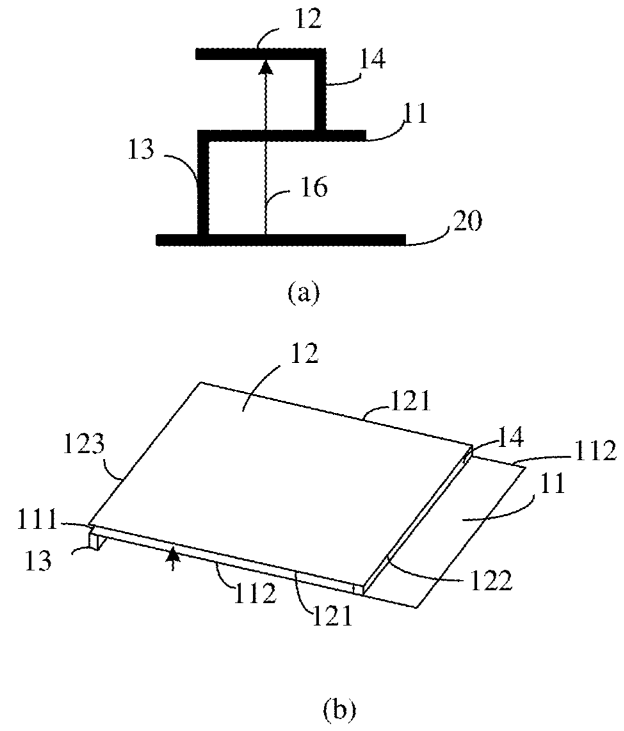
FIG. 13 is a schematic diagram of a structure of an antenna according to another embodiment of this application.

For example, the second short-circuit wall 14 may be connected to a radiator of the first radiation patch 11. As shown in FIG. 13, (a) in FIG. 13 is a front view of an antenna according to an embodiment of this application. (b) in FIG. 13 is a perspective view of the antenna shown in (a) in FIG. 13. As shown in (a) in FIG. 13 and (b) in FIG. 13, the antenna 10 includes a first radiation patch 11, a second radiation patch 12, a first short-circuit wall 13, and a second short-circuit wall 14, a projection of the first radiation patch 11 on a metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the first side 111 is a side of the first radiation patch 11 perpendicular to a first radiation side 112, the first radiation patch 11 transmits a signal along the first radiation side 112, a projection of the first radiation side 112 on the metal substrate 20 overlaps with a projection of a second radiation side 121 on the metal substrate 20 on the second radiation patch 12, the second short-circuit wall 14 is located between the first radiation patch 11 and the second radiation patch 12, the second short-circuit wall 14 is respectively connected to a second side 122 of the second radiation patch 12, a projection of a fourth side 123 of the second radiation patch 12 on the metal substrate 20 overlaps with a projection of the first side 111 on the metal substrate 20, the second side 122 is a side of the second radiation patch 12 that is farthest from the first side 111, the fourth side 123 is a side that is not adjacent to the second side 122, and the second radiation patch 12 transmits a signal along the second radiation side 121.

In the embodiments of this application, the first short-circuit wall is respectively connected to the first side of the first radiation and the metal substrate, and the second short-circuit wall is respectively connected to the second side of the second radiation patch and the third side of the first radiation patch, or the second short-circuit wall is respectively connected to the second side of the second radiation patch and the radiator of the first radiation patch (equivalent to the projection of the fourth side of the second radiation patch on the metal substrate overlapping with the projection of the first side on the metal substrate). The first side refers to a side of the first radiation patch perpendicular to the first radiation side, the second side refers to a side of the second radiation patch that is farthest from the first side, the third side refers to a side of the first radiation patch that is not adjacent to the first side, and the fourth side is a side that is not adjacent to the second side. The first radiation patch transmits a signal along the first radiation side, and the second radiation patch transmits a signal along the second radiation side. In other words, an antenna is provided in the embodiments of this application, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved. In addition, when the second short-circuit wall is connected to the second side of the second radiation patch, the second short-circuit wall may be connected to the third side, or may be connected to the radiator of the first radiation patch, so that the second short-circuit wall may move on the first radiator, and flexibility of a position of the second short-circuit wall is improved when performance of the antenna is improved.

In a possible case, when the first short-circuit wall 13 is connected to the first side 111 of the first radiation patch 11, an area of the second radiation patch 12 is greater than an area of the first radiation patch 11, the second short-circuit wall 12 is connected to a third side 113 of the first radiation patch 11, and the third side 113 is a side of the first radiation patch 11 that is not adjacent to the first side 111. The second short-circuit wall 14 may or may be connected to the second side 122 of the second radiation patch 12, or may be connected to a radiator of the second radiation patch 12. This is not limited in the embodiments of this application. It should be understood that when the second short-circuit wall is connected to the radiator of the second radiation patch 12, the projection of the fourth side 123 of the second radiation patch 12 on the metal substrate 20 overlaps with the projection of the first side 111 on the metal substrate 20, and the fourth side 123 is a side of the second radiation patch 12 that is closest to the first side 111.

Figure 14:
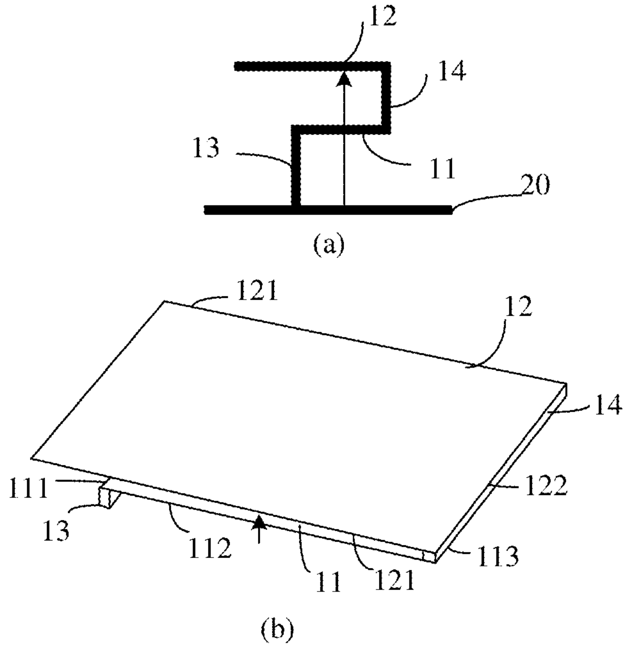
FIG. 14 is a schematic diagram of a structure of an antenna according to another embodiment of this application.

For example, the second short-circuit wall 14 may be connected to a side of the second radiation patch 12. As shown in FIG. 14, (a) in FIG. 14 is a front view of an antenna according to an embodiment of this application. (b) in FIG. 14 is a perspective view of the antenna shown in (a) in FIG. 14. As shown in (a) in FIG. 14 and (b) in FIG. 14, the antenna 10 includes a first radiation patch 11, a second radiation patch 12, a first short-circuit wall 13, and a second short-circuit wall 14, an area of the second radiation patch 12 is greater than an area of the first radiation patch 11, a projection of the first radiation patch 11 on a metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the first side 111 is a side of the first radiation patch 11 perpendicular to a first radiation side 112, the first radiation patch 11 transmits a signal along the first radiation side 112, a projection of the first radiation side 112 on the metal substrate 20 overlaps with a projection of a second radiation side 121 on the metal substrate 20 on the second radiation patch 12, the second short-circuit wall 14 is located between the first radiation patch 11 and the second radiation patch 12, and the second short-circuit wall 14 is respectively connected to a third side 113 of the first radiation patch 11 and a second side 122 of the second radiation patch 12, where the third side 113 is a side of the first radiation patch 11 that is not adjacent to the first side 111, and the second side 122 is a side of the second radiation patch 12 that is farthest from the first side 111.

Figure 15:
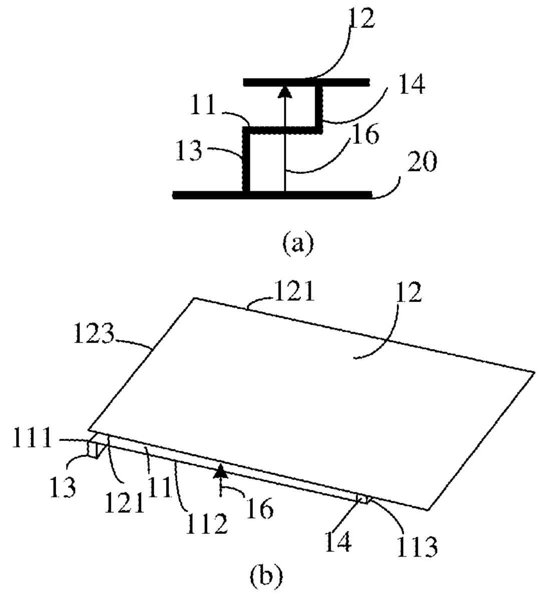
FIG. 15 is a schematic diagram of a structure of an antenna according to another embodiment of this application.

For example, the second short-circuit wall 14 may be connected to a radiator of the second radiation patch 12. As shown in FIG. 15, (a) in FIG. 15 is a front view of an antenna according to an embodiment of this application. (b) in FIG. 15 is a perspective view of the antenna shown in (a) in FIG. 15. As shown in (a) in FIG. 15 and (b) in FIG. 15, the antenna 10 includes a first radiation patch 11, a second radiation patch 12, a first short-circuit wall 13, and a second short-circuit wall 14, an area of the second radiation patch 12 is greater than an area of the first radiation patch 11, a projection of the first radiation patch 11 on a metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the first side 111 is a side of the first radiation patch 11 perpendicular to a first radiation side 112, the first radiation patch 11 transmits a signal along the first radiation side 112, a projection of the first radiation side 112 on the metal substrate 20 overlaps with a projection of a second radiation side 121 on the metal substrate 20 on the second radiation patch 12, the second short-circuit wall 14 is located between the first radiation patch 11 and the second radiation patch 12, and is respectively connected to a third side 113 of the first radiation patch 11 and a radiator of the second radiation patch 12, where the third side 113 is a side of the first radiation patch 11 that is not adjacent to the first side 111. When the second short-circuit wall 14 is connected to the radiator of the second radiation patch 12, a projection of a fourth side 123 of the second radiation patch 12 on the metal substrate 20 overlaps with a projection of the first side 111 on the metal substrate 20, and the fourth side 123 is a side of the second radiation patch 12 that is closest to a first side 111.

In the embodiments of this application, an area of the second radiation patch is greater than an area of the first radiation patch, the first short-circuit wall is respectively connected to the first side of the first radiation and the metal substrate, and the second short-circuit wall is respectively connected to the second side of the second radiation patch and the third side of the first radiation patch, or the second short-circuit wall is respectively connected to the radiator of the second radiation patch (equivalent to the projection of the fourth side of the second radiation patch on the metal substrate overlapping with the projection of the first side on the metal substrate) and the third side of the first radiation patch. The first side refers to a side perpendicular to the first radiation side in the first radiation patch, the second side refers to a side of the second radiation patch that is farthest from the first side, the third side refers to a side of the first radiation patch that is not adjacent to the first side, and the fourth side is a side that is not adjacent to the second side. The first radiation patch transmits a signal along the first radiation side, and the second radiation patch transmits a signal along the second radiation side. In other words, an antenna is provided in the embodiments of this application, because the first short-circuit wall and the second short-circuit wall are respectively arranged on two sides of the antenna, an electric field direction of a lower cavity formed by the first radiation patch and the metal substrate is the same as an electric field direction of an upper cavity formed by the first radiation patch and the second radiation antenna. In other words, equivalent magnetic current directions are opposite, so that an equivalent magnetic current offset is high, and radiation efficiency of the antenna is improved. In addition, when the second short-circuit wall is connected to the third side of the first radiation patch, the second short-circuit wall may be connected to the second side of the second radiator, or may be connected to the radiator of the second radiation patch, so that the second short-circuit wall may move on the second radiator, and flexibility of a position of the second short-circuit wall is improved when performance of the antenna is improved.

In a possible case, the antenna may further include a first structural body, and/or the second structural body, which are respectively configured to adjust impedance of the first radiation patch and impedance of the second radiation patch.

It should be understood that the antenna shown in any one of FIG. 12 to FIG. 15 may include the first structural body and/or the second structural body.

A position of the first structural body and/or the second structural body will be described below by using the antennas shown in FIG. 16 and FIG. 17.

Figure 16:
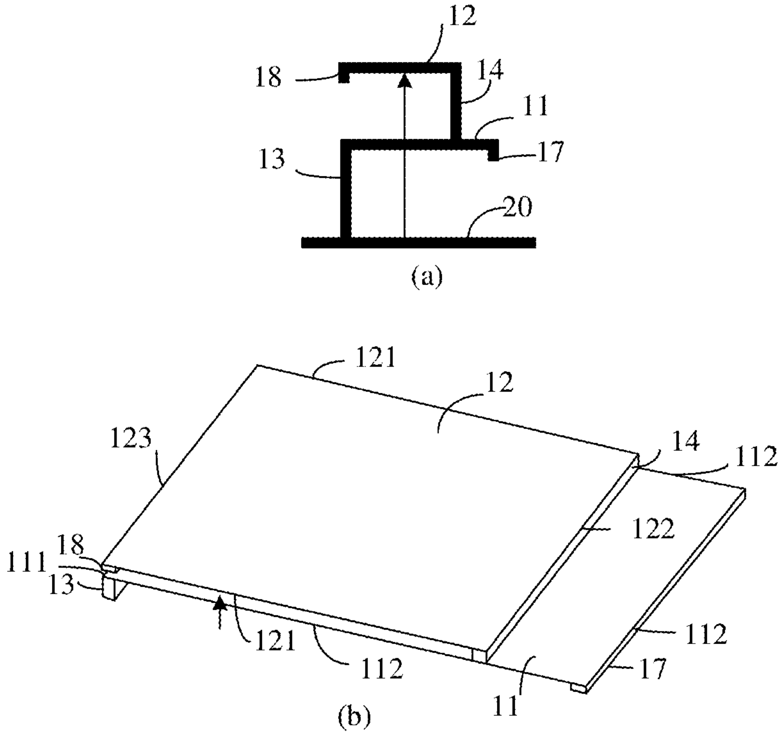
FIG. 16 is a schematic diagram of a structure of an antenna according to another embodiment of this application.

FIG. 16 is a schematic diagram of a structure of an antenna according to another embodiment of this application. (a) in FIG. 16 is a front view of an antenna according to an embodiment of this application. (b) in FIG. 16 is a perspective view of the antenna shown in (a) in FIG. 16. As shown in (a) in FIG. 16 and (b) in FIG. 16, the antenna 10 includes a first radiation patch 11, a second radiation patch 12, a first short-circuit wall 13, a second short-circuit wall 14, a first structural body 17, and a second structural body 18, a projection of the first radiation patch 11 on a metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the first side 111 is a side of the first radiation patch 11 perpendicular to a first radiation side 112, the first radiation patch 11 transmits a signal along the first radiation side 112, a projection of the first radiation side 112 on the metal substrate 20 overlaps with a projection of a second radiation side 121 on the metal substrate 20 on the second radiation patch 12, the second short-circuit wall 14 is located between the first radiation patch 11 and the second radiation patch 12, the second short-circuit wall 14 is respectively connected to a second side 122 of the second radiation patch 12 and a third side 113 of the first radiation patch 11, the second side 122 is a side of the second radiation patch 12 that is farthest from the first side 111, the second radiation patch 12 transmits a signal along the second radiation side 121, and the third side 113 is a side of the first radiation patch that is not adjacent to the first side. The first structural body 17 is connected to the first radiation patch 11, and is configured to adjust impedance of the first radiation patch 11. The second structural body 18 is connected to the second radiation patch 12, and is configured to adjust impedance of the second radiation patch 12.

It should be understood that a first structural body 17 and a second structural body 18 may be metal structural bodies. For example, the first structural body may be a metal block having a same width as the first radiation patch 11, or the first structural body may be a metal block having a same width as the second radiation patch 12. Adding an additional metal structural body on a radiation patch may change a boundary condition of the radiation patch, to change impedance of the radiation patch.

In a possible case, affected by a limited region in which the antenna may be placed in the electronic device, a length of the antenna 10 obtained by simulation is greater than a length of an area of the electronic device in which the antenna 10 may be placed. Therefore, the first structural body 17 may be added on the first radiation patch 11, and/or the second structural body 18 may be added on the second radiation patch 12, so that performance of the antenna 10 placed in limited space in the electronic device is close to performance of an antenna with a greater size obtained by simulation.

In the embodiments of this application, when a region in which the antenna may be placed on the electronic device is limited, the impedance of the first radiation patch 11 is adjusted through the first structural body 17, and impedance of the second radiation patch 12 is adjusted through the second structural body 18. This further reduces space occupied by the antenna, and implements miniaturization of the antenna in the electronic device.

Figure 17:
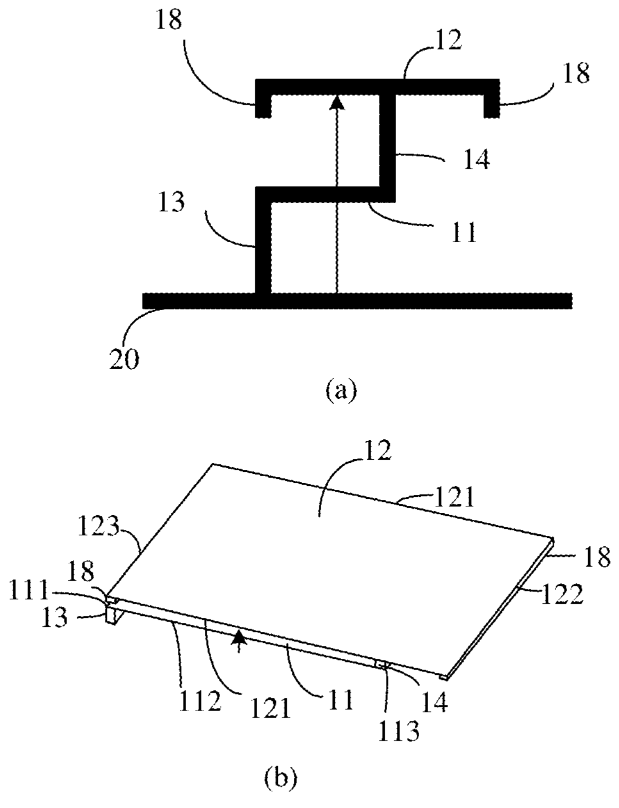
FIG. 17 is a schematic diagram of a structure of an antenna according to another embodiment of this application.

FIG. 17 is a schematic diagram of a structure of an antenna according to another embodiment of this application. (a) in FIG. 17 is a front view of an antenna according to an embodiment of this application. (b) in FIG. 17 is a perspective view of the antenna shown in (a) in FIG. 17. As shown in (a) in FIG. 17 and (b) in FIG. 17, the antenna 10 includes a first radiation patch 11, a second radiation patch 12, a first short-circuit wall 13, a second short-circuit wall 14, and a second structural body 18, an area of the second radiation patch 12 is greater than an area of the first radiation patch, a projection of the first radiation patch 11 on the metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the first side 111 is a side of the first radiation patch 11 perpendicular to a first radiation side 112, the first radiation patch 11 transmits a signal along the first radiation side 112, a projection of the first radiation side 112 on the metal substrate 20 overlaps with a projection of a second radiation side 121 on the metal substrate 20 on the second radiation patch 12, the second short-circuit wall 14 is located between the first radiation patch 11 and the second radiation patch 12, the second short-circuit wall 14 is respectively connected to a third side 113 of the first radiation patch 11 and a radiator of the second radiation patch 12, a second side 122 is a side of the second radiation patch 12 that is farthest from the first side 111, and the second radiation patch 12 transmits a signal along the second radiation side 121. The second structural body 18 is connected to the second radiation patch 12, and is configured to adjust impedance of the second radiation patch 12. When the second short-circuit wall 14 is connected to the radiator of the second radiation patch 12, a projection of a fourth side 123 of the second radiation patch 12 on the metal substrate 20 overlaps with a projection of the first side 111 on the metal substrate 20, and the fourth side 123 is a side of the second radiation patch 12 that is closest to a first side 111.

The second structural body 18 is two metal structural bodies, and the two metal structural bodies are respectively connected to two ends of the second radiation patch 12.

For example, the second structure body 18 is respectively connected to the second side 122 of the second radiation patch 12 and a fourth side 123 of the second radiation patch 12.

In the embodiments of this application, the antenna further includes a first structural body, and the first structural body is configured to adjust impedance of the first radiation patch; and/or the antenna further includes a second structural body, and the second structural body is configured to adjust impedance of the second radiation patch. When a region of the electronic device in which the antenna may be placed is limited, the impedance of the first radiation patch is adjusted through the first structural body, and impedance of the second radiation patch is adjusted through the second structural body. Furthermore, an antenna with a small size may also meet a requirement. This further reduces space occupied by the antenna, and implements miniaturization of the antenna in the electronic device.

The foregoing embodiments focus on describing a position relationship between the first short-circuit wall 13 and the second short-circuit wall 14. In a possible case, the antenna 10 further includes a feed source 16. To improve performance of the antenna 10 in different frequency bands, the performance of the antenna 10 may further be improved by changing a feeding manner of the feed source 16. A description is made below with reference to FIG. 18 to FIG. 23.

Figure 18:
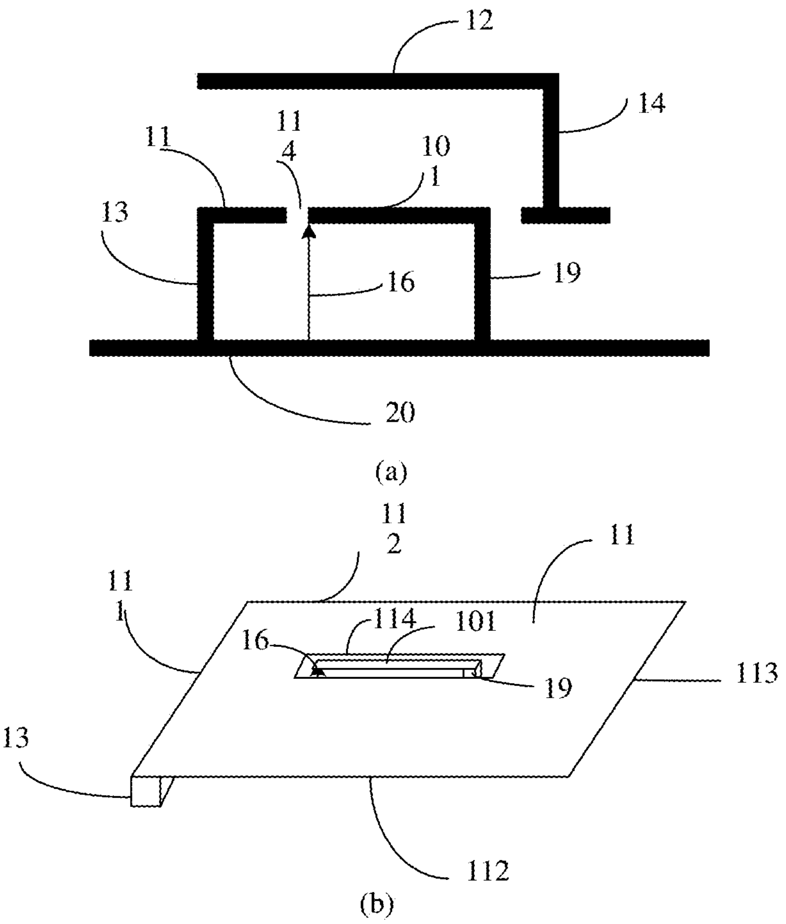
FIG. 18 is a schematic diagram of a structure of an antenna according to another embodiment of this application.

FIG. 18 is a schematic diagram of a structure of an antenna according to another embodiment of this application. (a) in FIG. 18 is a front view of an antenna according to an embodiment of this application. (b) in FIG. 18 is a perspective view of the antenna shown in (a) in FIG. 18 with a second radiation patch hidden. As shown in (a) in FIG. 18 and (b) in FIG. 18, the antenna 10 includes a first radiation patch 11, a second radiation patch 12, a first short-circuit wall 13, a second short-circuit wall 14, a feed source 16, a third short-circuit wall 19, and a first metal body 101, and a second structural body 101, a projection of the first radiation patch 11 on the metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the first side 111 is a side of the first radiation patch 11 perpendicular to a first radiation side 112, the first radiation patch 11 transmits a signal along the first radiation side 112, the second short-circuit wall 14 is located between the first radiation patch 11 and the second radiation patch 12, the second short-circuit wall 14 is respectively connected to a second side 122 (not shown in the figure) of the second radiation patch 12 and a third side 113 of the first radiation patch 11, the second side 122 is a side of the second radiation patch 12 that is farthest from a first side 111, the third side 113 is a side of the first radiation patch that is not adjacent to the first side, the first radiation patch 11 further includes a first groove 114, a first metal body 101 is arranged in the first groove 114, one end of the first metal body 101 is connected to the third short-circuit wall 19, the other end of the first metal body 101 is connected to the feed source 16, and when the antenna 10 operates in a target frequency band, the feed source 16 sends an excitation signal to the second radiation patch 12 through a gap between the first metal body 101 and the first radiation patch 11.

The antenna 10 shown in FIG. 18 is similar in structure to the antenna 10 shown in FIG. 12. Compared with the antenna 10 shown in FIG. 12, when the antenna 10 shown in FIG. 18 operates in the target frequency band, the feed source 16 sends the excitation signal to the second radiation patch 12 through the gap between the first metal body 101 and the first radiation patch 11. It means that a coupled feed structure is used in the antenna 10 shown in FIG. 18. Compared with the direct feeding manner shown in FIG. 12, magnetic field excitation is further introduced in the coupled feed structure. This enhances excitation to a resonant cavity.

Figure 19:
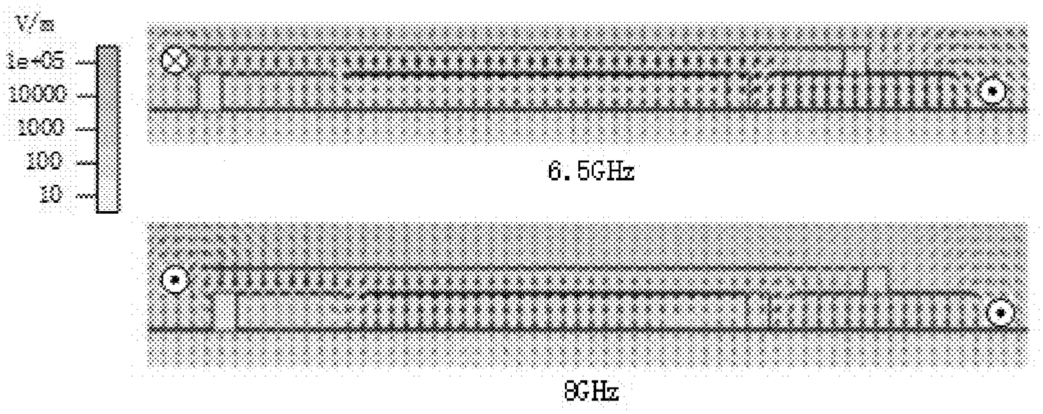
FIG. 19 is a schematic diagram of an electric field distribution of an antenna according to another embodiment of this application.
Figure 20:
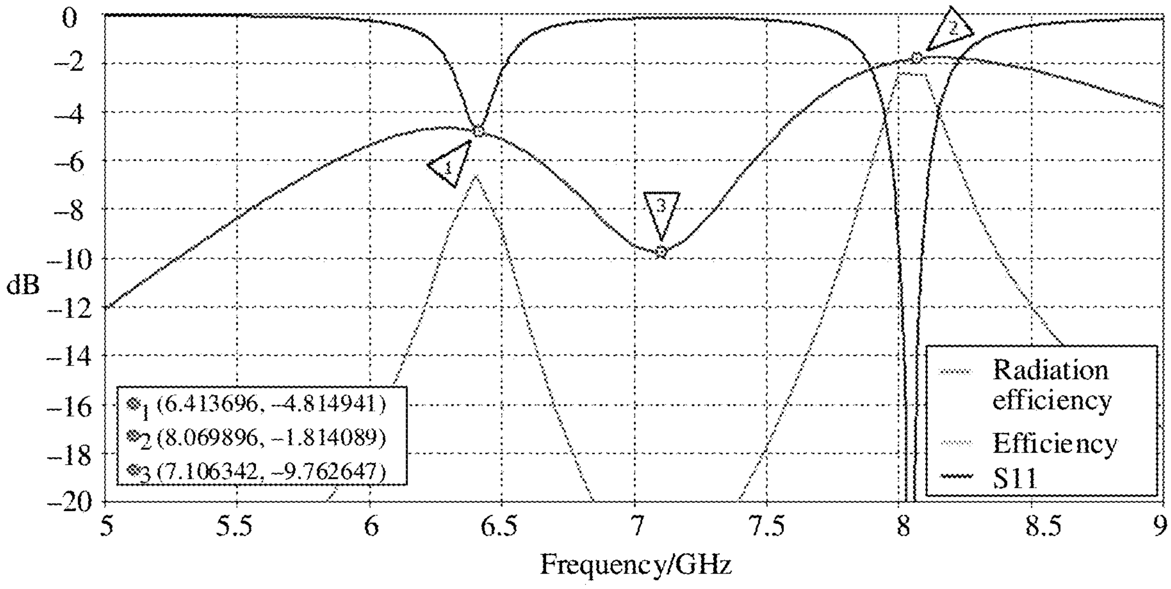
FIG. 20 is a schematic diagram of an S parameter of an antenna according to another embodiment of this application.

A length of a radiation side of the first radiation patch 11 is 6.7 mm, and a thickness of a filling medium 15 between the first radiation patch 11 and the metal substrate 20 is 0.3 mm. The length of the radiation side of the second radiation patch 12 is 5.6 mm, and a thickness of the filling medium 15 between the first radiation patch 11 and the second radiation patch 12 is 0.2 mm. Simulation is performed by using an example in which the filling medium 15 is LCP with a dielectric constant of 2.9. An electric field distribution diagram is as shown in FIG. 19. The coupled feed structure may more fully excite a parasitic cavity mode, resulting in a further increase in radiation efficiency at 8 GHz with a magnetic current in a same direction, and a further decrease in radiation efficiency at 6.5 GHz with a magnetic current in an opposite direction. For example, an efficiency curve diagram may be as shown in FIG. 20, and the radiation efficiency at 8 GHz is high.

It should be understood that a groove is provided on the first radiation patch 11, and the first metal body 101 and the third short-circuit wall 19 are added, so that an antenna structure of the coupled feed structure may be applied to the antenna provided in any embodiment in FIG. 12 to FIG. 17, and this is only an example.

In the embodiments of this application, the first radiation patch further includes a first groove, the first metal body is arranged in the first groove, one end of the first metal body is connected to the third short-circuit wall, and the other end of the first metal body is connected to the feed source, so that when the antenna operates in the target frequency band, the feed source sends an excitation signal to the second radiation patch through a gap between the first metal body and the first radiation patch, which means that a coupled feed structure is used in the antenna. Compared with a direct feeding manner, magnetic field excitation may be introduced through the coupled feed structure, which enhances excitation to a resonant cavity. In this way, radiation efficiency of a magnetic current isotropic antenna in the high frequency band is improved.

Figure 21:
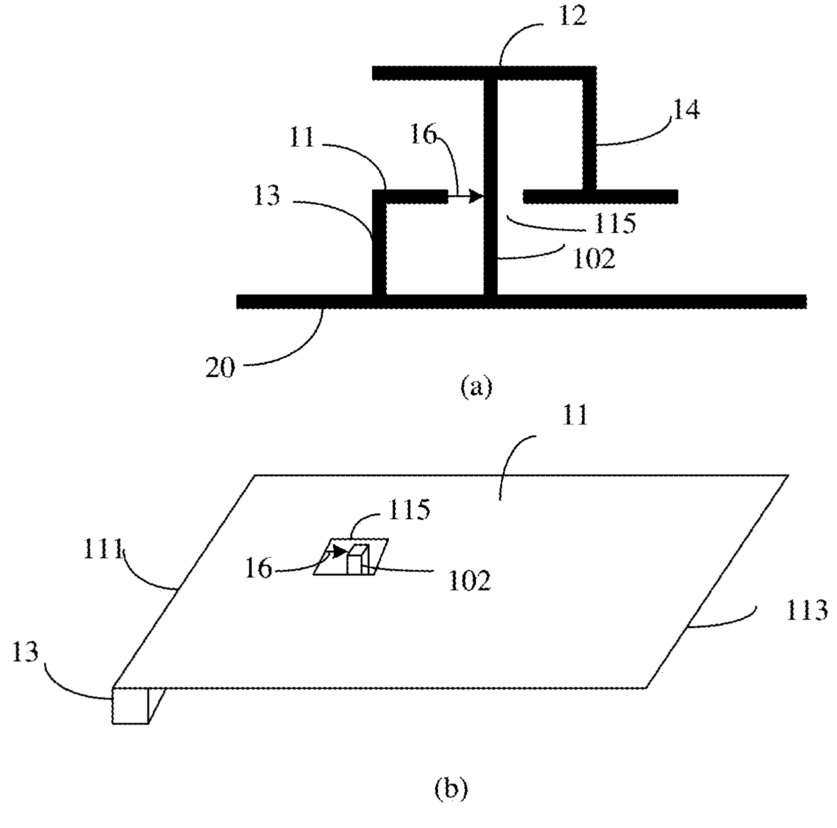
FIG. 21 is a schematic diagram of a structure of an antenna according to another embodiment of this application.

FIG. 21 is a schematic diagram of a structure of an antenna according to another embodiment of this application. (a) in FIG. 21 is a front view of an antenna according to an embodiment of this application. (b) in FIG. 21 is a perspective view of the antenna shown in (a) in FIG. 21 with a second radiation patch 12 hidden. As shown in (a) in FIG. 21 and (b) in FIG. 21, the antenna 10 includes a first radiation patch 11, a second radiation patch 12, a first short-circuit wall 13, a second short-circuit wall 14, a feed source 16, and a fourth short-circuit wall 102, a projection of the first radiation patch 11 on a metal substrate 20 overlaps with a projection of the second radiation patch 12 on the metal substrate 20, a projection of the first short-circuit wall 13 on the metal substrate 20 does not overlap with a projection of the second short-circuit wall 14 on the metal substrate 20, the first short-circuit wall 13 is located between the first radiation patch 11 and the metal substrate 20, the first short-circuit wall 13 is respectively connected to a first side 111 of the first radiation patch 11 and the metal substrate 20, the second short-circuit wall 14 is located between the first radiation patch 11 and the second radiation patch 12, the second short-circuit wall 14 is respectively connected to a second side 122 (not shown in the figure) of the second radiation patch 12 and a radiator of the first radiation patch 11, the second side 122 is a side of the second radiation patch 12 that is farthest from the first side 111, a third side 113 is a side of the first radiation patch that is not adjacent to the first side, the first radiation patch 11 further includes a second groove 115, the fourth short-circuit wall 102 connects the second radiation patch 12 and the metal substrate 20 through the second groove 115, and the feed source 16 sends an excitation signal to the fourth short-circuit wall 102 through the first radiation patch 11.

The antenna 10 shown in FIG. 21 is similar to the antenna 10 shown in FIG. 12 in structures. Compared with the antenna 10 shown in FIG. 12, when the antenna 10 shown in FIG. 21 operates, the feed source 16 performs horizontal feeding on the fourth short-circuit wall 102 through the first radiation patch 11, which is equivalent to introducing excitation of a horizontal field, so that an electric field direction of an upper cavity and an electric field direction of a lower cavity are opposite. The upper cavity refers to a cavity formed by the first radiation patch 11 and the second radiation patch 12, and the lower cavity refers to a cavity formed by the first radiation patch 11 and the metal substrate 20. Horizontal feeding may cause a magnetic current to be in a same direction when the antenna operates at 6.5 GHz, and improve radiation efficiency.

Figure 22:
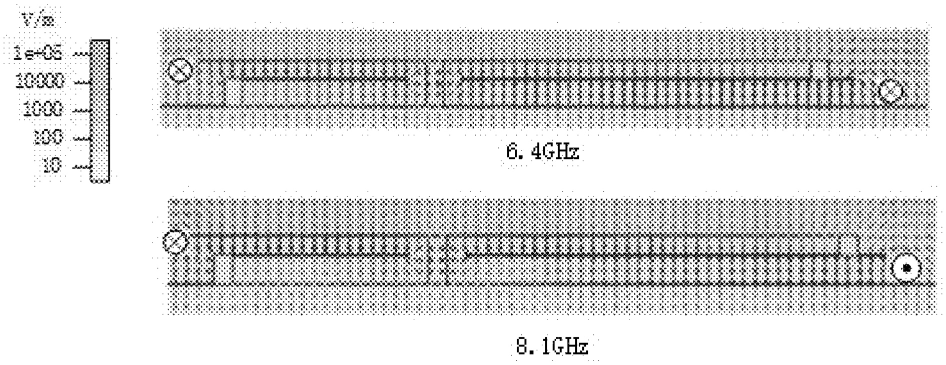
FIG. 22 is a schematic diagram of an electric field distribution of an antenna according to another embodiment of this application.
Figure 23:
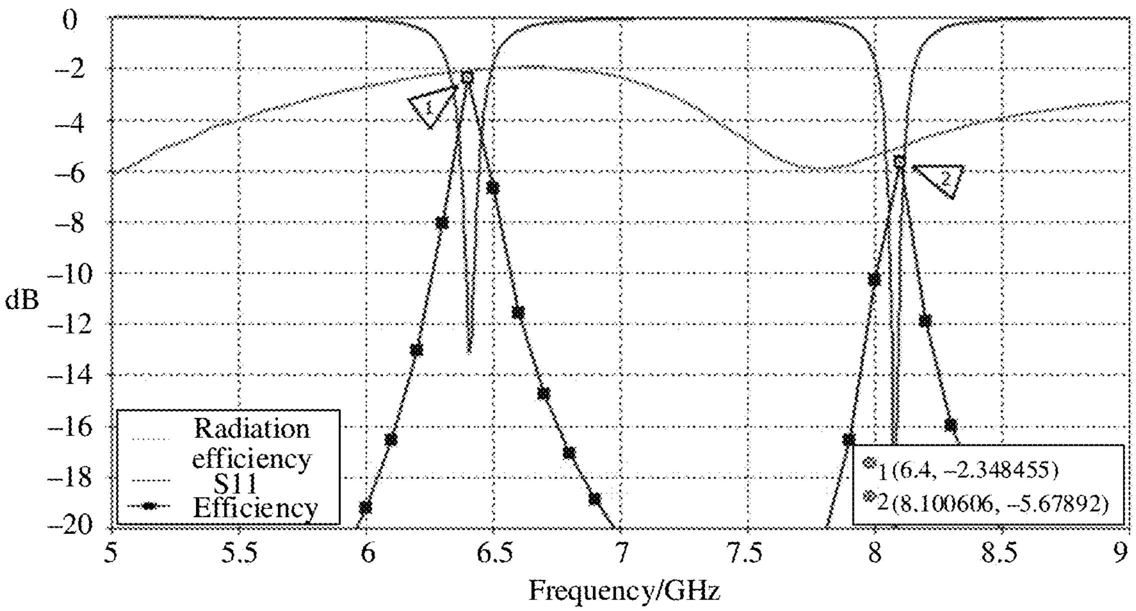
FIG. 23 is a schematic diagram of an S parameter of an antenna according to another embodiment of this application.

For example, a length of a radiation side of the first radiation patch 11 is 6.7 mm, and a thickness of a filling medium 15 between the first radiation patch 11 and the metal substrate 20 is 0.3 mm. The length of the radiation side of the second radiation patch 12 is 5.6 mm, and a thickness of the filling medium 15 between the first radiation patch 11 and the second radiation patch 12 is 0.2 mm. Simulation is performed by using an example in which the filling medium 15 is LCP with a dielectric constant of 2.9. The electric field distribution diagram is as shown in FIG. 22, and the horizontal feeding may cause the magnetic current to be in the same direction when the antenna 10 operates at 6.5 GHz, and improve radiation efficiency at 6.5 GHz. An efficiency curve diagram may be as shown in FIG. 23, and the radiation efficiency at 6.5 GHz is high.

It should be understood that a groove is provided on the first radiation patch 11, and the fourth short-circuit wall 102 is added, so that an antenna structure of the horizontal feeding may be applied to the antenna provided in any embodiment in FIG. 12 to FIG. 17, and this is only an example.

In the embodiments of this application, the antenna includes a first radiation patch, a second radiation patch, a first short-circuit wall, a second short-circuit wall, a fourth short-circuit wall, and a feed source. The first radiation patch further includes a first groove, so that when the antenna operates, the feed source performs horizontal feeding on the fourth short-circuit wall through the first radiation patch, which is equivalent to introducing excitation of a horizontal field. Therefore, an electric field direction of an upper cavity and an electric field direction of a lower cavity are opposite, so that in a lower frequency band, a magnetic flow of the upper cavity and a magnetic flow of the lower cavity are in a same direction, and radiation efficiency of the lower frequency band is improved.

In an embodiment, a UWB antenna array is provided, where the UWB antenna array includes at least three antennas as described in any one of FIG. 7 to FIG. 21.

It should be understood that a structure of each antenna in the UWB antenna array is similar to the antenna structures in FIG. 7 to FIG. 21, and a position relationship of each antenna in the UWB antenna array meets a requirement for implementing a function of the UWB antenna array. For example, a distance between two antennas that perform angle measurement in a same direction is greater than ¼ λ and less than ½ λ. λ refers to a wavelength corresponding to a frequency band in which the antenna operates.

Implementation principles and beneficial effects of the UWB antenna array provided in the embodiments of this application are similar to those of the antenna provided in the foregoing embodiments. This is not repeated herein.

In an embodiment, an electronic device is provided, and the electronic device includes the UWB antenna array.

Implementation principles and beneficial effects of the electronic device provided in the embodiments of this application are similar to those of the antenna provided in the foregoing embodiments. This is not repeated herein.

In this application, "at least one" refers to one or more, and "a plurality of" refers to two or more. "At least one of the following" or a similar expression thereof refers to any combination of these items, including one item or any combination of a plurality of items. For example, at least one of a, b, or c may represent a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art can clearly understand that for convenience and conciseness of description, for specific working processes of the foregoing described system, apparatus and unit, reference can be made to the corresponding processes in the foregoing method embodiments, and details are not described herein.

In the several embodiments provided in this application, it should be understood that the disclosed system, apparatus, and method may be implemented in other manners. For example, the apparatus embodiments described above are only examples: for example, division of the units is only a logical function division, and is merely logical function division, and there may be other division modes during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of the present disclosure shall be subject to the protection scope of the claims.

What is claimed is:

1. An antenna, wherein the antenna operates in a target frequency band, a width of the target frequency band is greater than a preset threshold, the target frequency band comprises a first frequency and a second frequency, and the antenna is arranged on a metal substrate; and the antenna comprises a first radiation patch, a second radiation patch, a first short-circuit wall, and a second short-circuit wall, a projection of the first radiation patch and a projection of the second radiation patch on the metal substrate overlap, a projection of the first short-circuit wall on the metal substrate does not overlap with a projection of the second short-circuit wall on the metal substrate, the first short-circuit wall is located between the first radiation patch and the metal substrate, and is respectively connected to a first side of the first radiation patch and the metal substrate, the first side is a side of the first radiation patch perpendicular to a first radiation side, and the first radiation patch transmits a signal along the first radiation side, the second short-circuit wall is located between the first radiation patch and the second radiation patch, and is respectively connected to the first radiation patch and the second radiation patch, a resonant frequency of the first radiation patch is the first frequency, and a resonant frequency of the second radiation patch is the second frequency; and a projection of the first radiation side of the first radiation patch on the metal substrate overlaps with a projection of a second radiation side on the metal substrate on the second radiation patch, and the second radiation patch transmits a signal along the second radiation side, wherein the antenna further comprises a first structural body, and the first structural body is configured to adjust impedance of the first radiation patch; and/or the antenna further comprises a second structural body, and the second structural body is configured to adjust impedance of the second radiation patch.

2. The antenna according to claim 1, wherein the second short-circuit wall is connected to a second side of the second radiation patch, and the second side is a side of the second radiation patch that is farthest from the first side.

3. The antenna according to claim 2, wherein the second short-circuit wall is connected to a third side of the first radiation patch, and the third side is a side of the first radiation patch that is not adjacent to the first side.

4. The antenna according to claim 2, wherein a projection of a fourth side of the second radiation patch on the metal substrate overlaps with a projection of the first side on the metal substrate, and the fourth side is a side that is not adjacent to the second side.

5. The antenna according to claim 1, wherein an area of the second radiation patch is greater than an area of the first radiation patch, the second short-circuit wall is connected to a third side of the first radiation patch, and the third side is a side of the first radiation patch that is not adjacent to the first side.

6. The antenna according to claim 5, wherein the second short-circuit wall is connected to a second side of the second radiation patch, and the second side is a side of the second radiation patch that is farthest from the first side.

7. The antenna according to claim 5, wherein a projection of a fourth side of the second radiation patch on the metal substrate overlaps with a projection of the first side on the metal substrate, and the fourth side is a side of the second radiation patch that is closest to the first side.

8. The antenna according to claim 1, wherein the antenna further comprises a feed source, a third short-circuit wall, and a first metal body, the first radiation patch comprises a first groove, the first metal body is arranged in the first groove, one end of the first metal body is connected to the third short-circuit wall, and the other end of the first metal body is connected to the feed source; and when the antenna operates in the target frequency band, the feed source sends an excitation signal to the second radiation patch through a gap between the first metal body and the first radiation patch.

9. The antenna according to claim 1, wherein the antenna further comprises a feed source and a fourth short-circuit wall, the first radiation patch comprises a second groove, the fourth short-circuit wall is connected to the second radiation patch and the metal substrate through the second groove, and the feed source sends an excitation signal to the fourth short-circuit wall through the first radiation patch.

10. The antenna according to claim 1, wherein a length of the first radiation patch is $\frac{1}{4}\lambda_1$, and a length of the second radiation patch is $\frac{1}{4}\lambda_2$, wherein $\lambda_1$ is a wavelength corresponding to the first frequency, and $\lambda_2$ is a wavelength corresponding to the second frequency.

11. An ultra-wide band antenna array, wherein the ultra-wide band antenna array comprises at least three antennas, wherein each of the at least three antennas operates in a target frequency band, a width of the target frequency band is greater than a preset threshold, the target frequency band comprises a first frequency and a second frequency, and the antenna is arranged on a metal substrate; and the antenna comprises a first radiation patch, a second radiation patch, a first short-circuit wall, and a second short-circuit wall, a projection of the first radiation patch and a projection of the second radiation patch on the metal substrate overlap, a projection of the first short-circuit wall on the metal substrate does not overlap with a projection of the second short-circuit wall on the metal substrate, the first short-circuit wall is located between the first radiation patch and the metal substrate, and is respectively connected to a first side of the first radiation patch and the metal substrate, the first side is a side of the first radiation patch perpendicular to a first radiation side, and the first radiation patch transmits a signal along the first radiation side, the second short-circuit wall is located between the first radiation patch and the second radiation patch, and is respectively connected to the first radiation patch and the second radiation patch, a resonant frequency of the first radiation patch is the first frequency, and a resonant frequency of the second radiation patch is the second frequency; and a projection of the first radiation side of the first radiation patch on the metal substrate overlaps with a projection of a second radiation side on the metal substrate on the second radiation patch, and the second radiation patch transmits a signal along the second radiation side, wherein the antenna further comprises a first structural body, and the first structural body is configured to adjust impedance of the first radiation patch; and/or the antenna further comprises a second structural body, and the second structural body is configured to adjust impedance of the second radiation patch.

12. An electronic device, wherein the electronic device comprises a ultra-wide band antenna array, wherein the ultra-wide band antenna array comprises at least three antennas, wherein each of the at least three antennas operates in a target frequency band, a width of the target frequency band is greater than a preset threshold, the target frequency band comprises a first frequency and a second frequency, and the antenna is arranged on a metal substrate; and the antenna comprises a first radiation patch, a second radiation patch, a first short-circuit wall, and a second short-circuit wall, a projection of the first radiation patch and a projection of the second radiation patch on the metal substrate overlap, a projection of the first short-circuit wall on the metal substrate does not overlap with a projection of the second short-circuit wall on the metal substrate, the first short-circuit wall is located between the first radiation patch and the metal substrate, and is respectively connected to a first side of the first radiation patch and the metal substrate, the first side is a side of the first radiation patch perpendicular to a first radiation side, and the first radiation patch transmits a signal along the first radiation side, the second short-circuit wall is located between the first radiation patch and the second radiation patch, and is respectively connected to the first radiation patch and the second radiation patch, a resonant frequency of the first radiation patch is the first frequency, and a resonant frequency of the second radiation patch is the second frequency; and a projection of the first radiation side of the first radiation patch on the metal substrate overlaps with a projection of a second radiation side on the metal substrate on the second radiation patch, and the second radiation patch transmits a signal along the second radiation side, wherein the antenna further comprises a first structural body, and the first structural body is configured to adjust impedance of the first radiation patch; and/or the antenna further comprises a second structural body, and the second structural body is configured to adjust impedance of the second radiation patch.

13. The electronic device according to claim 12, wherein the second short-circuit wall is connected to a second side of the second radiation patch, and the second side is a side of the second radiation patch that is farthest from the first side.

14. The electronic device according to claim 13, wherein the second short-circuit wall is connected to a third side of the first radiation patch, and the third side is a side of the first radiation patch that is not adjacent to the first side.

15. The electronic device according to claim 13, wherein a projection of a fourth side of the second radiation patch on the metal substrate overlaps with a projection of the first side on the metal substrate, and the fourth side is a side that is not adjacent to the second side.

16. The electronic device according to claim 12, wherein an area of the second radiation patch is greater than an area of the first radiation patch, the second short-circuit wall is connected to a third side of the first radiation patch, and the third side is a side of the first radiation patch that is not adjacent to the first side.

17. The electronic device according to claim 16, wherein the second short-circuit wall is connected to a second side of the second radiation patch, and the second side is a side of the second radiation patch that is farthest from the first side.

18. The electronic device according to claim 16, wherein a projection of a fourth side of the second radiation patch on the metal substrate overlaps with a projection of the first side on the metal substrate, and the fourth side is a side of the second radiation patch that is closest to the first side.

* * * * *